United States Patent
Harada et al.

[11] Patent Number: 5,831,963
[45] Date of Patent: Nov. 3, 1998

[54] OPTICAL RECORDING MEDIUM HAVING ZONES WHEREIN THE NUMBER OF SECTORS PER TRACK IS CONSTANT AND METHOD OF INJECTION-MOLDING THE SAME

[75] Inventors: Shigenobu Harada; Masae Kubo; Motonori Ueda; Michio Kawai; Masatoshi Kimura; Tomohiro Yamazaki, all of Yokohama, Japan

[73] Assignee: Mitsubishi Chemical Corporation, Tokyo, Japan

[21] Appl. No.: 861,282

[22] Filed: May 21, 1997

Related U.S. Application Data

[63] Continuation-in-part of Ser. No. 559,300, Nov. 15, 1995, abandoned.

[30] Foreign Application Priority Data

Nov. 16, 1994 [JP] Japan .................................. 6-282175
Jan. 20, 1995 [JP] Japan ..................................... 7-7519
Jun. 2, 1995 [JP] Japan .................................. 7-136621
Jun. 2, 1995 [JP] Japan .................................. 7-136622
Jun. 7, 1995 [JP] Japan .................................. 7-140400

[51] Int. Cl.$^6$ .................................................. G11B 7/24
[52] U.S. Cl. ..................................... 369/275.3; 369/275.4
[58] Field of Search ............................ 369/275.3, 275.4, 369/275.1, 275.2, 59, 54, 13, 47, 48, 58, 116, 288, 284, 283; 360/48

[56] References Cited

U.S. PATENT DOCUMENTS 4,731,013  3/1988  Schrammel et al. ...................... 425/542
4,949,326  8/1990  Takagi et al. .............................. 369/54
4,964,094  10/1990 Satoh et al. ................................ 369/59

(List continued on next page.)

FOREIGN PATENT DOCUMENTS 0 329 122 A2  8/1989  European Pat. Off. .
0 369 422 A2  5/1990  European Pat. Off. .
0 380 002 A2  8/1990  European Pat. Off. .
0 559 449 A2  9/1993  European Pat. Off. .

(List continued on next page.)

OTHER PUBLICATIONS

Siegfried Anders, et al., "Spritzgiessen von Compact Discs" [Injection–molding of Compact Discs] in Kunststoffe [Plastics], vol. 77, No. 1, pp. 21–26, Munich, 1987.
Derwent English abstract of JP 3–047 831–A of 28 Feb. 1991.
Derwent English abstract of JP 4–132 027–A of 6 May 1992.
Derwent English abstract of JP 4–356 745–A of 10 Dec. 1992.
Derwent English abstract of JP 5–159 378–A of 25 Jun. 1993.

*Primary Examiner*—Ali Neyzari
*Attorney, Agent, or Firm*—David G. Conlin; George W. Neuner

[57] ABSTRACT

A large-capacity optical recording medium, comprises a track region having a plurality of tracks arranged along the concentric or spiral grooves, the track region being radially divided into annular zones, and each of the tracks being partitioned into plural sectors such that a number of the sectors per track is constant in each zone but the number of the sectors per track differs between among zones, wherein an address designating a specific track and sector is previously recorded as a plurality of prepits, the track region having a user-track region, in which a user can optically record or readout information, and a pair of control-track regions, radially bracketing said user-track region, the control-track region permitting the user to read out information therefrom but not to record information thereon, and wherein the control-track region located radially inward of the user-track region is provided with medium information tracks in which medium information has been recorded as prepits, and the control-track region located outward of the user-track region has no medium information track and is not used for recording, nor for reading out of user data.

19 Claims, 8 Drawing Sheets

U.S. PATENT DOCUMENTS

| | | | |
|---|---|---|---|
| 5,006,058 | 4/1991 | Maruyama et al. | 425/556 |
| 5,077,720 | 12/1991 | Takagi et al. | 369/59 |
| 5,292,550 | 3/1994 | Fujii et al. | 427/165 |
| 5,377,178 | 12/1994 | Saito et al. | 369/124 |
| 5,402,411 | 3/1995 | Maeda et al. | 369/275.1 |
| 5,539,723 | 7/1996 | Hoshino et al. | 369/275.3 |
| 5,706,268 | 1/1998 | Horimai | 369/59 |

FOREIGN PATENT DOCUMENTS

| | | |
|---|---|---|
| 36 13 334 C2 | 10/1987 | Germany . |
| 38 39 536 A1 | 6/1989 | Germany . |
| 40 29 099 A1 | 4/1992 | Germany . |
| 42 03 590 A1 | 12/1992 | Germany . |
| 94/14159 | 6/1994 | WIPO . |

OPTICAL RECORDING MEDIUM HAVING ZONES WHEREIN THE NUMBER OF SECTORS PER TRACK IS CONSTANT AND METHOD OF INJECTION-MOLDING THE SAME

CROSS REFERENCE TO RELATED APPLICATION

This is a continuation-in-part of application Ser. No. 08/559,300 filed on Nov. 15, 1995, now abandoned.

BACKGROUND OF THE INVENTION

The present invention relates to a large-capacity optical recording medium and a method of injection-molding the optical recording medium from polycarbonate resin components.

An optical recording medium is produced by forming a substrate from a precise master thereof by subjecting it faithfully to injection compression molding to replicate the pattern on the master, and then forming a recording layer, a reflective film, a protective film, etc., on the substrate.

In the conventional optical recording medium, the track region is composed of a user track region and control track regions on the inside and outside of the user track region, and each of the control track regions has the medium information tracks where the medium information has been recorded as prepits. Provision of information tracks in the control track regions on both sides of the user track region is intended to enhance the reliability of the recording medium. The recording medium has a redundant structural design according to which even in case where the medium information track on either side of the user track region should become incapable of reading-out, it is still possible to obtain the desired medium information using the remaining information track.

Also, in the conventional optical recording medium, the 2 mm-outermost peripheral section of the optical recording medium was unused for recording and reading-out. Recently, however, as means for increasing the recording capacity without dimensional enlargement of the optical recording medium, it has been proposed to widen the recording/reading-out region, to increase the area recording density and to change the recording system.

For instance, in order to enlarge the recording and reading-out region, it has been discussed to increase the number of the tracks capable of recording and reading-out by expanding the track region to the areas on the inside and the outside thereof which have been unused hitherto. Increase of the area recording density can be achieved either by diminishing the spacing between the tracks (track pitch) or by reducing the size of the recording marks or prepits.

An example of the change of the recording system is switch from the CAV (constant angular velocity) system in which the number of the sectors partitioning the track in the circumferential direction is the same at the inner and outer peripheries to the MCAV (modified constant angular velocity) system in which the number of the sectors partitioning the track in the circumferential direction increases radially from the inner periphery toward the outer periphery. In the CAV system, the linear recording density decreases proportionally to the distance from the inner periphery toward the outer periphery. For avoiding lowering of the linear recording density at the outer periphery, it is expedient to increase the number of the sectors radially from the inner periphery toward the outer periphery, that is, employment of the MCAV system is recommended.

The modulation system has also been switched from the PPM (pit position modulation) system to the PWM (pulse width modulation) system. PPM system is a system in which prepits or recording marks are formed in correspondence to, for example, 1 in the row of information bits expressed by 0 and 1 recorded on the optical recording medium. In the PWM system, the leading or trailing edge of prepits or recording marks corresponds to, for example, 1 in the row of information bits expressed by 0 and 1 recorded on the optical recording medium. Change from the PPM system to the PWM system resulted in an approximately 1.5-fold increase of recording density.

In view of cost and mass productivity, optical recording medium is produced by forming a recording layer, a reflective film, a protective film, etc., on a transparent substrate, and usually polycarbonate resin is used as substrate material. Substrate, especially polycarbonate resin substrate, involves the problems concerning optical anisotropy, namely birefringence and warpage (tilt) of the substrate. Particularly in the case of magneto-optical recording medium, influence of birefringence is large since a small Kerr rotation angle of about 0.5° is detected. However, lateral birefringence has been confined less than $20 \times 10^{-6}$ which is no problem in practical application, by optimization of the molecular weight of the resin or improvement of molding technique. On the other hand, vertical birefringence, namely the absolute value of the difference between the refractive index in the direction parallel to the substrate surface and that in the direction vertical to the substrate, is large and may reach not less than $500 \times 10^{-6}$ in the polycarbonate resin substrate, but its influence has also been reduced to a level causing practically no problem for use, by the development of the optical head.

It is indeed possible to increase the recording capacity of the optical recording medium by employing the outer periphery expansion system, MCAV system or PWM system, but it needs to overcome the following problems.

According to the method in which the track region is enlarged, particularly in case where the region is expanded to the outside area which has been unused in the past (outer periphery expansion system), grooves or prepits are formed in the area where no grooves or prepits existed in the conventional optical recording medium. This area has been the mirror finished surface portion where no grooves or prepits were formed. This was due to the fact that replication from the optical recording medium master to the substrate in the step of injection compression molding is excessively deteriorated in the outer peripheral portion, thereby making it difficult to form the satisfactory grooves or prepits. Consequently, it becomes difficult to obtain a stable tracking of the optical head on a specified track in the outer peripheral enlarged region. This accounts for non-use of the expanded outer peripheral area in the conventional recording media.

The problem is more serious in the case of a format having the medium information tracks at the outer periphery. Presence of a large number of prepits in the medium information track serves for hampering uniform replication of the grooves and unstabilizing the tracking itself of the optical head. This is because in the medium information track, unlike in the user track region, prepits are formed over the entire periphery of the track.

In case where the outer periphery expansion system is employed for a format having a medium information track at the outermost periphery, since the information track exists just in the enlarged area at the outer periphery, the dimensional uniformity of the grooves in this region is impaired.

The dimensional non-uniformity of the grooves leads to an increase of noise and a rise of CN ratio, resulting in deterioration of reading-out signal.

The problem becomes even more complex when the MCAV system is employed in combination with the outer periphery expansion system. When the MCAV system is employed, it becomes hard to obtain sufficient reading-out signal from the prepits in the outer peripheral region.

In the CAV system, since the number of the sectors partitioning the track in the circumferential direction is the same at the inner and outer peripheries, the size of the prepits is enlarged substantially proportionally to the radius of the optical recording medium. Thus, since the prepits can maintain a pertinent size, although replication in the injection compression molding step is somewhat reduced in the outer peripheral region, there can be obtained reading-out signal with a sufficient strength from the prepits.

In the MCAV system, since the size of the prepit in the outer periphery is about the same as that in the inner periphery regardless of the radius of the optical recording medium, when the replication in the injection compression molding step is somewhat reduced in the outer peripheral region, there is hardly obtained the reading-out signal with a sufficient strength from the prepits because the prepits with a sufficient size is hardly obtained in the outer peripheral region.

It is seen from the above that in the optical recording medium employing both outer periphery expansion system and MCAV system, it is very difficult to realize positive tracking of the optical head and to secure reading-out signal in the outer peripheral region.

Resin substrate, especially polycarbonate resin substrate involves the problems concerning its optical anisotropy, specifically birefringence and tilt of the substrate.

For obtaining higher recording density of optical recording medium, the realization of semiconductor laser with a wavelength on the order of 680 nm has been put to practical use and it is expected that a high-output and low-cost semiconductor laser would be provided in the near future. Also, the technique for obtaining a wavelength of around 500 nm by combining a high-output semiconductor laser of a wavelength of around 800 to 1,000 nm and a non-linear optical device has advanced, and miniaturization of the optical head by combination of a laser and non-linear optical device is progressing. Further, it is reported that a semiconductor laser with a wavelength of around 500 nm has been developed successfully in laboratories.

Thus, the optical recording medium using a short-wavelength semiconductor laser has now entered the stage where it is ready for mass production, starting with an optical recording medium using a semiconductor laser with a wavelength of around 680 nm. It is also under consideration to enlarge the numerical aperture (NA) of the convergent objective lens to not less than 0.55 for obtaining a smaller light spot.

Under these circumstances, it is feared that optical anisotropy or tilt of resin substrate, which once appeared to have been set at rest, would again become a serious problem.

There are pointed out the following two typical problems concerning optical anisotropy (birefringence) of resin substrate.

The first problem is phase shift which is produced when the light beam passes the substrate. (A detailed explanation on this matter is given in W. A. Challener and T. A. Rinehart: Appl. Opt., 31 (1992), page 1,853). In a recording medium in which recording and reading-out of information is made by making use of polarization of light and its rotation in that direction as a magneto-optical recording medium, there is produced a phenomenon that the polarized light is made more and more elliptical (ellipsization of light beam) with rotation of linear polarized light in a specific direction, and this causes a drop of carrier level or an increase of common mode noise in the working optical head.

Ordinary polycarbonate resin substrate has biaxial or monoaxial optical anisotropy, which means that the phase shift differs depending on the direction of incident light. Since convergent light beam is diversified in orientation of incident light, it becomes a medley of innumerable light beams having phase shifts, and a complicate wave front that can not be easily corrected by a phase-contrast plate is formed.

Phase shift is decided by the following formula:

$$\Delta n \cdot d / \lambda$$

wherein $\Delta n$ is birefringence of the substrate which is decided by the direction of incidence of light, d is substrate thickness and $\lambda$ is wavelength. Accordingly, the phase shift substantially increases as the wavelength used for recording and reading-out is shortened. Therefore, the problem of phase shift due to birefringence of the substrate becomes serious in the magneto-optical recording medium used with light of a short wavelength, especially less than 700 nm.

The second problem is astigmatism due to birefringence. (A detailed discussion is made in B. E. Berbachi and M. Mansuripur: Appl. Opt., 32 (1993), page 6,547). Convergent light beam is refracted when it enters the substrate not vertically but aslant thereto, and as is well known, the refractive index of the substrate having optical anisotropy differs according to the direction of incident light or its angle of incidence, so that the astigmatism occurs with the beam to be converged within an area of about 1 $\mu$m in diameter on the recording layer side of the substrate.

When the astigmatism occurs, the recording and reading-out characteristics vary depending on the individual difference of the optical head for adjusting the focal plane. In case where the light beam becomes an elliptical beam having the major axis in the transverse direction of the track, cross talks from the adjacent tracks come into problem, and this problem becomes more serious in the case of an optical recording medium using a light source with a short wavelength because the track pitch is reduced.

A substrate made of a polycarbonate resin comprising 2,2-bis(4-hydroxyphenyl)propane[bisphenol A], which is popularly used in the art, and having its vertical birefringence adjusted to be less than $400 \times 10^{-6}$ has been proposed (Japanese Patent Application Laid-Open (Kokai) No. 62-204451), but the production process of the substrate is not disclosed therein detailedly, and it is uncertain whether a substrate having well balanced properties both optically and mechanically can be provided according to the present invention.

In Japanese Patent Application Laid-Open (Kokai) No. 62-121767, the major axis horizontal to the substrate surface is proposed, but its description of the production method is also not definite and it is not clear whether this substrate can satisfy both optical and mechanical property requirements.

These proposals are merely aimed at reducing the phase shift through birefringence with a mind to an optical recording medium of a relatively low recording density using light with a wavelength of around 800 nm.

In Japanese Patent Application Laid-Open (Kokai) No. 63-135211, it is proposed to release the clamping pressure by the time when the resin is solidified after completion of injection compression molding. But this proposal involves the problem that the resin tends to shrink relatively freely, thereby causing delicate deformation or improper replication.

There are also the proposals in view of material, involving use of a polyolefin resin with low optical anisotropy, but these proposals are not necessarily suited for practical use for the reasons such as poor adhesiveness of the polyolefin resin to the thin film formed thereon, low mass productivity of polyolefin resin and high cost due to the complicate production process.

Further, the above problems concerning birefringence are alleviated when the substrate thickness, which is usually 1.2 mm, is reduced to less than 1.0 mm. Such a thin substrate is subject to warpage when used singly and is also poor in mechanical stability, so that it is required to use as a laminate of such substrates.

Besides, U.S. Pat. No. 4,964,094 discloses an optical disk having a control track, which is divided into sectors in a manner similarly to a data track to record data and comprises a plurality of sectors, each sector being composed of a sector identifying portion ID in which address information is recorded and a control field portion CF in which control data is recorded. Further, FIG. 2 of U.S. Pat. No. 4,964,094 discloses an optical disk having a control track, a data track and a read only data track. However, the optical disk of U.S. Pat. No. 4,964,094 can not attain to minimize the optical anisotropy such as birefringence and tilt of the substrate and is not capable of making recording or reading-out in the outer peripheral region even when an outer periphery expansion system or an MCAV system is employed.

As a result of the present inventors' earnest studies, it has been found that in an optical recording medium, comprising a track region having a plurality of tracks arranged along the concentric or spiral grooves, the track region being radially divided into annular zones, and each of the tracks being partitioned into plural sectors such that a number of the sectors per track is constant in each zone but the number of the sectors per track differs between among zones, wherein an address designating a specific track and sector is previously recorded as a plurality of prepits, by constructing the track region having a user-track region in which a user can optically record or readout information, and a pair of control-track regions, radially bracketing the user-track region, the control-track region permitting the user to read out information therefrom but not to record information thereon, and by providing in the control-track region located radially inward of the user-track region, medium information tracks in which medium information has been recorded as prepits, and the control-track region located outward of the user-track region has no medium information track and is not used for recording, nor for reading out of user data, an optical recording medium in which the optical anisotropy such as birefringence and tilt of the substrate is minimized and which is capable of making recording or reading-out in the outer peripheral region even when an outer periphery expansion system or an MCAV system is employed, can be obtained. The present invention has been achieved on the basis of the finding.

SUMMARY OF THE INVENTION

The object of the present invention is to provide an optical recording medium in which the optical anisotropy such as birefringence and tilt of the substrate is minimized and which is capable of making recording or reading-out in the outer peripheral region even when an outer periphery expansion system or an MCAV system is employed.

To accomplish the aim, in a first aspect of the present invention, there is provided an optical recording medium, comprising a track region having a plurality of tracks arranged along the concentric or spiral grooves, the track region being radially divided into annular zones, and each of the tracks being partitioned into plural sectors such that a number of the sectors per track is constant in each zone but the number of the sectors per track differs between among zones, wherein an address designating a specific track and sector is previously recorded as a plurality of prepits, the track region having a user-track region, in which a user can optically record or readout information, and a pair of control-track regions, radially bracketing the user-track region, the control-track region permitting the user to read out information therefrom but not to record information thereon, and wherein the control-track region located radially inward of the user-track region is provided with medium information tracks in which medium information has been recorded as prepits, and the control-track region located outward of the user-track region has no medium information track and is not used for recording, nor for reading out of user data.

In a second aspect of the present invention, there is provided an optical recording medium, comprising a track region having a plurality of tracks arranged along the concentric or spiral grooves, the track region being radially divided into annular zones, and each of the tracks being partitioned into plural sectors such that a number of the sectors per track is constant in each zone but the number of the sectors per track differs between among zones, wherein an address designating a specific track and sector is previously recorded as a plurality of prepits, the track region having a user-track region, in which a user can optically record or readout information, and a pair of control-track regions, radially bracketing the user-track region, the control-track region permitting the user to read out information therefrom but not to record information thereon, and wherein the control-track region located radially inward of the user-track region is provided with medium information tracks in which medium information has been recorded as prepits, and the control-track region located outward of the user-track region has no medium information track and is not used for recording, nor for reading out of user data, the radius of the outer periphery of the optical recording medium is 43 mm, no track region exists outside a radius of 41.3 mm of the medium and no user-track region exists outside a radius of 41.0 mm of the medium, and the prepits are recorded according to a pulse-width modulation (PWM) system.

In a third aspect of the present invention, there is provided an optical recording medium having a track region comprising a plurality of tracks provided along the concentric or spiral grooves, the track region being radially divided into annular zones, and each of the tracks being partitioned into plural sectors such that the number of the sectors per track is constant in each zone but differs between zones, wherein an address designating a specific track and sector is previously recorded as prepits, the track region having a user-track region, in which a user can optically record or readout information, and a pair of control-track regions, radially bracketing the user-track region, the control-track regions permitting the user to read out information therefrom but not to record information thereon, and wherein the control-track region located radially inward of the user-track region is provided with medium information tracks in which medium information has been recorded as prepits, and the control-track region located outward of the user-track region has no medium information track and is not used for recording, nor for reading out of user data, the radius of the outer periphery of the optical recording medium is 43 mm, no track region is present outside a radius of 41.3 mm of the medium, and in the track region, tracking of an optical head along a specific track is performed by making use of the grooves, and tracking signal uniformity is not less than 0.80.

In a fourth aspect of the present invention, there is provided optical recording medium, comprising a track region having a plurality of tracks arranged along the concentric or spiral grooves, the track region being radially divided into annular zones, and each of the tracks being partitioned into plural sectors such that a number of the sectors per track is constant in each zone but the number of the sectors per track differs between among zones, wherein an address designating a specific track and sector is previously recorded as a plurality of prepits, the track region having a user-track region, in which a user can optically record or readout information, and a pair of control-track regions, radially bracketing the user-track region, the control-track region permitting the user to read out information therefrom but not to record information thereon, and wherein the control-track region located radially inward of the user-track region is provided with medium information tracks in which medium information has been recorded as prepits, and the control-track region located outward of the user-track region has no medium information track and is not used for recording, nor for reading out of user data, the radius of the outer periphery of the optical recording medium is 43 mm, no track region exists outside a radius of 41.3 mm of the medium and no user-track region exists outside a radius of 41.0 mm of the medium, and the prepits are recorded according to a pulse-width modulation (PWM) system, the optical recording medium produced by the steps of carrying out an injection compression molding of a resin from an optical recording medium master having a fine pattern thereon, thereby replicating the fine pattern and making a substrate of optical recording medium, and then forming at least a recording layer on the substrate, wherein the height of the grooves in the optical recording medium master is substantially constant up to a radius of 39 mm and becomes greater from the radius of 39 mm outward, and at a point with a radius of 41.3 mm, the groove height is 105 to 115%, based on the groove height in the area within a radius of 39 mm.

In a fifth aspect of the present invention, there is provided a process for producing an optical recording medium set forth in the second aspect, comprising the steps of carrying out an injection compression molding of a resin from an optical recording medium master having a fine pattern thereon, thereby replicating the fine pattern and making a substrate of optical recording medium, and then forming at least a recording layer on the substrate, wherein the height of the grooves in the optical recording medium master is substantially constant up to a radius of 39 mm and becomes greater from the radius of 39 mm outward, and at a point with a radius of 41.3 mm, the groove height is 105 to 115%, based on the groove height in the area within a radius of 39 mm.

In a sixth aspect of the present invention, there is provided aprocess for producing a substrate for an optical recording medium set forth in claim 1, comprising the steps of carrying out injection compression molding of a polycarbonate resin having an average molecular weight of 10,000 to 20,000 at a mold temperature satisfying the following formula:

$$Tg-40°\ C. \leq Tmo \leq Tg-10°\ C.,$$

wherein Tmo is a mold temperature, and Tg is glass transition point of said resin as determined by a differential scanning calorimeter, thereby replicating the fine pattern on said optical recording medium master, and then cooling the resin in the mold for a period satisfying the following formula:

$$-0.1\times(Tg-Tmo)+6 \leq tc \leq -0.33\times(Tg-Tmo)+20,$$

wherein tc (sec) is a cooling time of the resin in the mold, and wherein the polycarbonate resin comprises first carbonate bond-constructing units (component A) having at least one aromatic group are contained in a percentage of 100 to 0 wt %, based on all of the carbonate bond-constructing units, and second carbonate bond-constructing units (component B) having a group represented by the following formula (1):

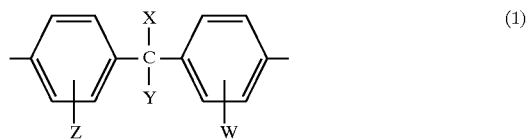

(wherein X, Y, Z and W are each selected from the group consisting of a hydrogen atom, and an aliphatic hydrocarbon group having 1–6 carbon atoms, are contained in a percentage of 0 to 100 wt %, based on all of the carbonate bond-constructing units.

In a seventh aspect of the present invention, there is provided a process for producing an optical recording medium set forth in claim 1, comprising the steps of carrying out an injection compression molding of a polycarbonate resin having an average molecular weight of 10,000 to 20,000 at a mold temperature satisfying the following formula:

$$Tg-40°\ C. \leq Tmo \leq Tg-10°\ C.,$$

wherein Tmo is a mold temperature and Tg is glass transition point of the resin determined by a differential scanning calorimeter, thereby replicating the fine pattern on the optical recording medium master, cooling the resin in the mold for a period satisfying the following formula:

$$-0.1 \times (Tg-Tmo)+6 \leq tc \leq -0.33 \times (Tg-Tmo)+20,$$

wherein tc (sec) is a cooling time of the resin in the mold, and then annealing for at least 30 minutes at a temperature satisfying the following formula:

$$Tg-50°\ C. \leq Ta \leq Tg-20°\ C.,$$

wherein Ta is a annealing temperature, wherein the polycarbonate resin comprises first carbonate bond-constructing units (component A) having at least one aromatic group are contained in a percentage of 20 to 0 wt %, based on all of the carbonate bond-constructing units and second carbonate bond-constructing units (component B) having a group represented by the above-shown formula (1) are contained in a percentage of 80 to 100 wt %, based on all of the carbonate bond-constructing units.

DETAILED DESCRIPTION OF THE INVENTION

Figure 1:
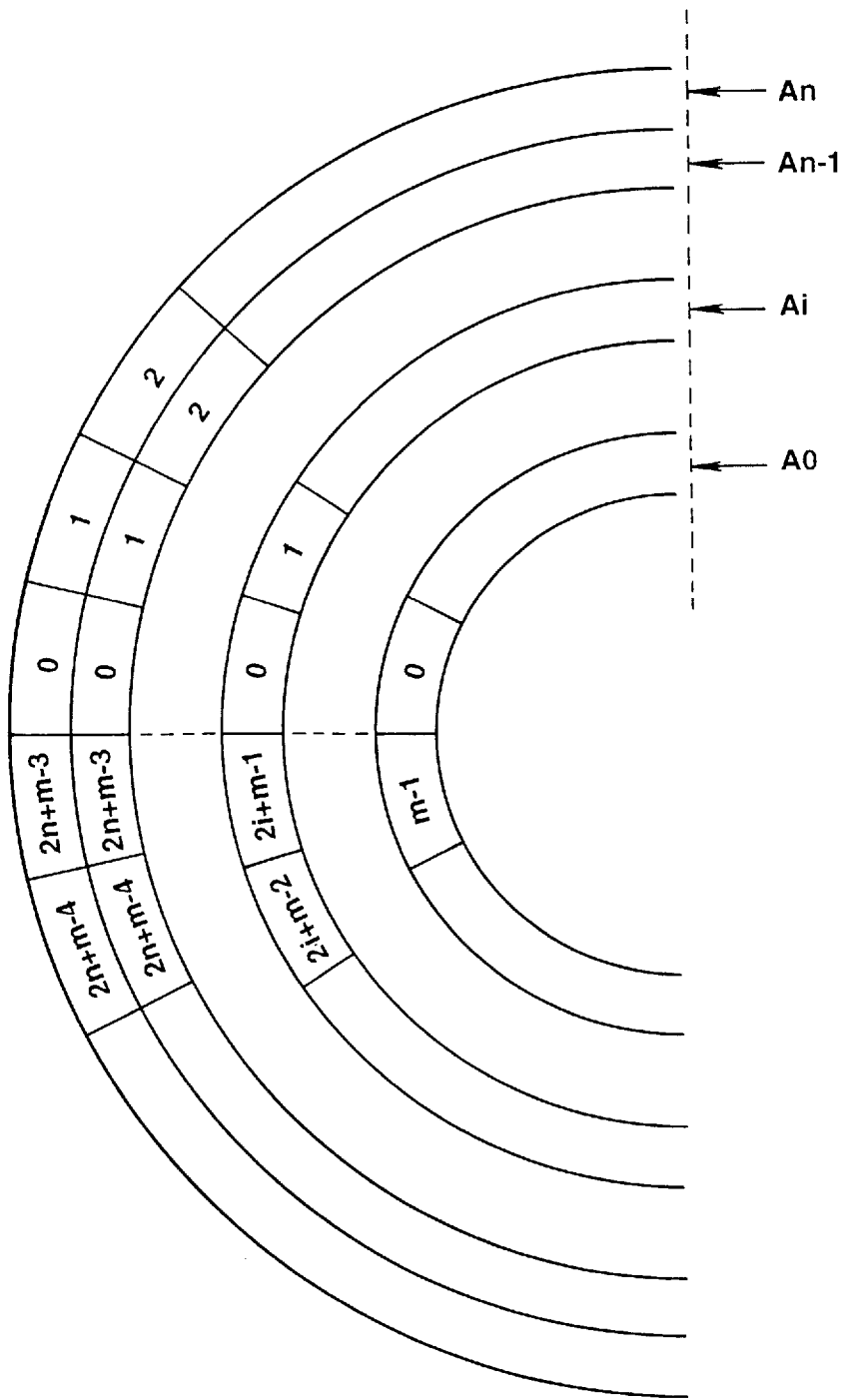
FIG. 1 is a diagrammatic illustration of the optical recording medium of Example 1.

In the conventional 86 φmm optical recording medium, the track region is an area ranging from a radius of 22.9 mm to a radius of 41.0 mm, in which the user track region occupies the area from a radius of 24.0 mm to a radius of 40.0 mm. It has been proposed to expand the track region to a peripheral area from a radius of 23.1 mm to a radius of 41.3 mm and the user track region to an area from a radius of 23.7 mm to a radius of 41.0 mm.

In recording and reading-out of an optical recording medium, CT (cross-track) signal, $CT_{min}$ (cross-track minimum) signal, PP (push-pull) signal and DPP (divided push-pull) signal such as specified in ISO (International Standard Organization)/IEC (International Electrotechnical Commission) DIS (Draft International Standard) 13963 are used for tracking the optical head on a specific track. For example, DPP signal is a signal derived from normalization of the differential signal with the sum signal from the light detectors in which the light reflected back from the optical recording medium is divided into two portions in the direction of the tracks in the medium. Since the differential signal is changed as the light spot departs from the land center, the tracking with DPP signal is possible. For stable tracking, these signals need to stay always in a specific range. The values of these specified signals are basically unchanged even if the recording capacity of the optical recording medium is increased.

These signals are subject to change depending on the size of grooves, so that the groove size is the most important factor for tracking. For example, DPP signal is maximized when the grooves are of the optimal depth, and enlargement of DPP signal allows wider variation of signal due to positional shift between the light spot and the land center. This facilitates tracking with accuracy. Thus, the larger the DPP signal, the better.

For conducting correct tracking, there is also required uniformity of signal in each optical recording medium in addition to signal level itself. ISO/IEC DIS 13963 regulates DPP signal uniformity to be not less than 0.70 in the user track region and not less than 0.56 in other track region. "DPP signal uniformity" is a relative representation of DPP signal at other position in a region where the maximum value of DPP signal was normalized as 1.

If the tracking signal is non-uniform in the track region, the tracking signal is greatly varied when the optical head is moved in the track region, so that it is necessary to compensate for the change of tracking signal by making proper adjustment of detector sensitivity or signal gain. This is also causative of unstable tracking. If DPP signal uniformity is not less than 0.80 in the whole track region, such signal variation is inhibited and stable tracking can be performed.

Non-uniformity of groove size is the largest reason for unavailability of uniform tracking signal. According to the optical recording medium of the present invention, it is possible to form grooves with a sufficient depth even in the expanded outer peripheral region, and grooves of uniform size can be formed in the whole track region, so that it is possible to raise DPP signal uniformity not less than 0.80.

Regarding reading-out signal in the recording layer, ISO/IEC DIS 13963 regulates the CN ratio (carrier/noise ratio)to be not less than 45 dB in the user track region and not less than 36 dB in the track regions other than the user track region. The value of reading-out signal required for reading-out of the optical recording medium is unchanged in principle even when the recording system or recording density is changed. The main factors influencing reading-out signal of the recording layer are uniformity of the layers (films) such as recording layer, birefringence of the substrate and non-uniformity of groove size.

If a layer is non-uniform and has an improperly formed portion, it becomes a cause of drop of carrier signal, thereby making it unable to obtain satisfactory reading-out signal. It is, however, possible to form the layers such as recording layer uniformly in the whole track region by sufficiently enlarging the inner diameter of the outer mask of the substrate in relation to the track region in the layer forming operation.

The birefringence of the substrate produces a phase shift of incident light to give an adverse effect to recording and reading-out. This problem becomes more serious in the case of magneto-optical recording medium, because in this case, the reading-out is conducted by a method in which the linearly polarized light beam is applied to the optical recording medium and the Kerr rotation angle of the reflected light is detected. In this case, there arise the problems such as ellipsization of linearly polarized light or rotation of the polarizing plane, reduction of signal amplitude, ill-balanced differential signal, increase of the quantity of incident light into the signal detector, and increase of noise such as laser back talk noise.

The substrate birefringence tends to increase at the outer periphery, and this is substantially a problem in the injection compression molding step. Injection of the resin is carried out from the center of the cavity and advanced toward the outer periphery under injection pressure. Injection pressure weakens as the operation approaches the outer periphery, and the resin flows in a complicated manner at the mold end at the outermost periphery to disturb orientation, resulting in an increase of birefringence. However, the birefringence can be decreased by taking suitable measures such as strengthening the injection pressure, or raising the resin temperature or mold temperature to better fluidity while giving considerations to the mechanical properties and replication of the substrate.

Since non-uniform size of grooves leads to an increase of noise, the groove size should be uniform. The conventional optical recording medium had a tendency that the grooves became shallow suddenly at the outer periphery. When the grooves are shallow, the reflecting light from the groove wall surface increases because of gentle slant of the wall surface, thereby making it easier to detect the roughness in the grooves not present on the land surface. This may cause an increase of noise.

According to the optical recording medium of the present invention, the grooves don't become shallow at the periphery and have uniform size in the whole track region, so that it is possible to lower the noise level and to keep the reading-out signal of the recording layer not less than 43 dB.

In the present invention, there is provided an optical recording medium, comprising a track region having a plurality of tracks arranged along the concentric or spiral grooves, the track region being radially divided into annular zones, and each of the tracks being partitioned into plural sectors such that a number of the sectors per track is constant in each zone but the number of the sectors per track differs between among zones, wherein an address designating a specific track and sector is previously recorded as a plurality of prepits, the track region having a user-track region, in which a user can optically record or readout information, and a pair of control-track regions, radially bracketing the user-track region, the control-track region permitting the user to read out information therefrom but not to record information thereon, and wherein the control-track region located radially inward of the user-track region is provided with medium information tracks in which medium information has been recorded as prepits, and the control-track region located outward of the user-track region has no medium information track and is not used for recording, nor for reading out of user data.

In the present invention, preferably there is provided an optical recording medium, in which in the above-mentioned optical recording medium, the number of the sectors in the outermost annular zone of the user track region is the same number as in the control track region on the outside of the user track region; in which in the above-mentioned optical recording medium, the radius of the outer periphery of the optical recording medium is 43 mm; no track region exists outside a radius of 41.3 mm of the medium and no user track region exists outside a radius of 41.0 mm of the medium; the prepits are recorded according to the PWM system; and in which in the above-mentioned optical recording medium, the track pitch is not more than 1.1 $\mu$m and the minimum mark length in the user track region is not more than 0.64 $\mu$m.

In the present invention, more preferably there is provided an optical recording medium, in which in the above-mentioned optical recording medium, the tracking signal uniformity is not less than 0.80; in which in the above-mentioned optical recording medium, the CN ratio of reading-out signal in the recording layer in the track region is not less than 43 dB; and in which in the above-mentioned optical recording medium, the reading-out signal amplitude of the prepits is not less than 0.18.

As explained above, in case of employing the MCAV system in combination with the outer periphery expansion system, several problems are involved in the format having the medium information tracks at the outermost periphery.

Firstly, it is hard to obtain reading-out signal of prepit in the expanded region. In the MCAV system, as the size of prepits at the outer periphery is as small as those at the inner periphery, the margin of replication at injection compression molding is narrow and it is hard to obtain sufficient prepits at the outer periphery as in the case of the grooves already discussed above. This problem becomes more serious in the outer periphery expanded region. In the medium information track, unlike in the user track region, if the medium information can not be read out, it entails the grave consequence that the optical recording medium itself becomes unusable. Its possibility is high under an unstable condition as in the outer periphery expanded region, and in such a location, it is rather preferable that no medium information track is present. The medium information tracks are also formed on the inner peripheral side of the optical recording medium, so that there is no problem even if no such medium information track is formed on the outer peripheral side since usually the medium information tracks on the inner peripheral side can be read out.

The control track region on the outside of the user track region, where no medium information track is provided, is not used for recording and reading-out of user data, and it is used for a test during manufacture of the optical recording medium or for trial writing with an optical recording medium recording/reading-out device, so that it does not directly contribute to recording capacity of the optical recording medium. It is, therefore, inexpedient to try to simply raise the recording capacity of the optical recording medium. When the number of the sectors partitioned in the control track region on the outside of the user track region is equalized with that in the outermost annular zone of the user track region, the manufacture of the optical recording medium is facilitated without affecting the recording capacity of the medium.

The presence of prepits hampers uniform replication of the grooves and serves for unstabilizing tracking itself, and in the medium information track, since the prepits are formed along the whole periphery of the track unlike in the user track region, the influence of such prepits is conspicuous. In this sense, it is preferable that no medium information track exists at the outer periphery.

In case where the prepits are recorded not by the PPM system but by the PWM system, the above problems are further amplified. In the track where the prepits have been recorded by the PWM system, the percentage of prepits is more than in the track where the prepits have been recorded by the PPM system, so that in the track of the PWM system the percentage of drop of DPP signal is higher, hence greater in influence on tracking, than in the track of the PPM system.

Such an influence is seen not only in the medium information tracks but also in the tracks on the outside of the medium information tracks on the outside of the user track region. These undesirable matters can all be eliminated by designing the optical recording medium, so that no medium information track will exist in the control track region on the outside of the user track region.

Now, the reading-out signal amplitude of the prepits is explained. The reading-out signal amplitude of the prepits is an expression of the difference in reflectance between the prepit portion and the non-prepit portion based on the reflectance of the land portion, and reading-out is hardly possible unless the signal amplitude has a value above a certain level. ISO/IEC DIS 13963 regulates the reading-out signal amplitude to be not less than 0.15 in the user track region and not less than 0.12 in other track region.

Insufficient size of prepits, that is, insufficient depth or width of prepits, is the greatest reason why a sufficient reading-out signal amplitude can not be obtained. According to the optical recording medium of the present invention, it is possible to form prepits with a sufficient size even in the outer periphery expanded region, and prepits with uniform size can be obtained in the whole track region, thereby making it possible to set the reading-out signal amplitude of prepits not less than 0.20.

In accordance with the present invention, there is provided a process for producing an optical recording medium such as described above, which comprises injection compression molding of a resin from an optical recording medium master having a fine pattern thereon, thereby replicating the fine pattern and making a substrate of an optical recording medium, and then forming at least a recording layer on the substrate, wherein the height of the grooves of the optical recording medium master is substantially constant up to a radius of 39 mm and becomes greater from the radius of 39 mm outwards, and at the point with a radius of 41.3 mm the groove height is 105 to 115% based on the groove height in the area within a radius of 39 mm. Preferably, there is further provided a process for producing an optical recording medium such as described above in which in the above-mentioned process, the width or height of the prepits in the optical recording medium master is substantially constant up to a radius of 39 mm and becomes greater from the radius of 39 mm outwards, and at the point with a radius of 41.3 mm the width or height of the prepits is 105 to 115% based on that of the prepits in the area within a radius of 39 mm.

The replicating percentage during injection about 80 to 100%, and what is characteristic of the medium is the fact that replication drops sharply in the outer peripheral region. In injection compression molding, injection of the resin is conducted from the center of the cavity and advanced toward the outer periphery under injection pressure. Since injection pressure weakens as the work advances to the outer periphery, it becomes difficult to spread the resin over the whole fine pattern of the optical recording medium master at the outer periphery, resulting in unsatisfactory replication.

Various methods are known for bettering replication, such as increasing injection pressure, elevating clamping pressure, or raising resin temperature or mold temperature to better resin fluidity. However, the conditions may cause deterioration of mechanical properties of the substrate. Thus, the scope of the optimal conditions for injection compression molding is very narrow, and it is difficult to change the conditions.

In the present invention, instead of raising the replicating percentage, there was employed a method in which the groove size or prepit size in the outer periphery alone is enlarged by taking into consideration replication of the groove shape or prepit shape of the optical recording medium master. Therefore, according to the present invention, it is possible to uniformalize the groove size or prepit size in the whole region with no need of changing the molding conditions. Since there is no possibility of deteriorating substrate birefringence by change of the molding conditions, there can be obtained an optical recording medium having a desired CN ratio of the recording layer.

In view of the fact that drop of replication in the outermost peripheral portion begins at a radius of around 39 mm, the groove height or the width or height of prepit is increased in accordance with the degree of drop of replication in the outer peripheral portion of the optical recording medium master, thereby making it possible to obtain a groove or prepit shape with a sufficiently large size at the outer peripheral portion of the substrate. The groove depth of the substrate or the optical recording medium master can be measured by, for example, a scanning tunnel microscope, and the prepit width of the substrate or the optical recording medium master can be measured by, for example, calculating the average value of the widths of the upper and the lower bottom of prepit using a photograph taken by microscope. The prepit height of the substrate or the prepit depth of the optical recording medium master can also be measured by, for example, a scanning tunnel microscope.

The ordinary process for producing an optical recording medium master comprises the steps of applying a photoresist on a substrate having a flat surface such as a glass substrate, exposing the photoresist to laser beams according to the recording system, followed by development to form the grooves and prepits, subjecting the thus treated surface to sputtering and electro-forming, and separating the master from the sputtered surface.

For adjusting the depth of the grooves or prepits, there may be methods wherein a photoresist which is thick at the outer periphery alone is applied, or the exposure power is increased at the outer periphery. The power may be increased linearly or may be elevated gradually at an increasing rate, depending on the way of drop of replication. Also, it may be increased in several stages at different rates. Increase of exposure power tends to cause enlargement of the grooves or prepits not only in their depth but also in their width direction. However, in the present invention, it was found that slight enlargement of the groove width of the optical recording medium master gives little influence on tracking signal of the optical recording medium corresponding to the groove shape of the substrate obtained from injection compression molding. In case where it is desired not to change the groove width of the optical recording medium master, several methods are available, such as narrowing down the focus during exposure. When the prepits are exposed by raising the exposure power, there is a tendency that not only the depth and width of the prepits but also the length thereof in the longitudinal direction is increased. However, this can be countervailed by adjusting the duty ratio of exposure.

In the present invention, polycarbonate resin is used as substrate material. The "carbonate bond" refers to a bond such as represented by the following formula (3), which can be obtained by reacting an alcoholic or phenolic hydroxyl group with, for example, phosgene:

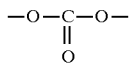 (3)

The "carbonate bond-constructing unit" refers to a divalent group present between the carbonate bonds described above. This carbonate bond-constructing unit may contain other bond species such as ester bond, amide bond, carbamate bond or ether bond.

The carbonate bond-constructing units (component A) having at least one suspending aromatic group may be, for example, the one having a group represented by the following formula (2):

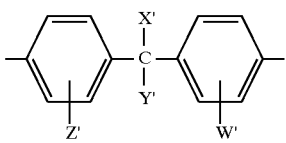 (2)

wherein X' and Y' are each a hydrogen atom, an aliphatic hydrocarbon group having 1–6 carbon atoms, an aryl group and an aralkyl group, and at least one of X' and Y' is an aryl group or an aralkyl group; and Z' and W' are each a hydrogen atom or an aliphatic hydrocarbon group having 1–6 carbon atoms.

The polycarbonates containing the carbonate bond-constructing units (component A) having at least one suspending aromatic group represented by the formula (2) can be obtained by reacting at least one of the bisphenolic compounds represented by the following formula (2') with phosgene:

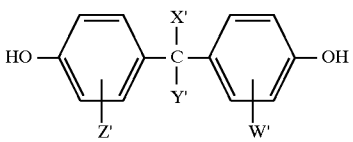 (2')

wherein X', Y', Z' and W' represent the same as defined in the formula (2).

Examples of the bisphenolic compounds represented by the formula (2') include bis(4-hydroxyphenyl)phenylmethane, 1,1-bis(4-hydroxyphenyl)-1-phenylethane, 1,1-bis(4-hydroxyphenyl)1-phenylpropane, bis(4-hydroxyphenyl)diphenylmethane and bis(4-hydroxyphenyl)dibenzylmethane.

The polycarbonate containing the carbonate bond-constructing units (component B) having a group represented by the following formula (1) can be obtained by reacting at least one of the bisphenolic compounds represented by the following formula (1') with phosgene.

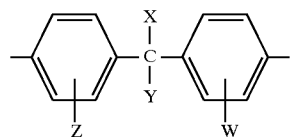 (1)

(wherein X, Y, Z and W are each a hydrogen atom or an aliphatic hydrocarbon group having –6 carbon atoms)

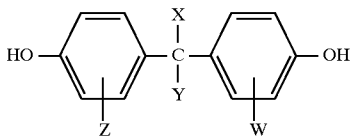 (1')

(wherein X, Y, Z and W represent the same as defined in the formula (1))

Examples of the bisphenolic compounds represented by the formula (1') include 2,2-bis(4-hydroxy-3-methylphenyl)propane, 2,2-bis(4-hydroxy-3-ethylphenyl)propane, 2,2-bis(4-hydroxy-3-isopropylphenyl)propane, 2,2-bis(4-hydroxy-3-sec-butylphenyl)propane, 2,2-bis(4-hydroxy-3-tertbutylphenyl)propane, bis(4-hydroxyphenyl)methane, 1,1-bis(4-hydroxyphenyl)ethane, 1,1-bis(4-hydroxyphenyl)propane, 2,2-bis(4-hydroxyphenyl)propane, viz. bisphenol A, 2,2-bis(4-hydroxyphenyl)butane, 2,2-bis(4-hydroxyphenyl)pentane, 2,2-bis(4-hydroxyphenyl)-3-methylbutane, 2,2-bis(4-hydroxyphenyl)hexane, and 2,2-bis(4-hydroxyphenyl)-4-methylpentane.

For producing a substrate for optical recording medium according to the present invention, there is prepared a polycarbonate resin having the carbonate bond-constructing units (component A) having at least one suspending aromatic group and the carbonate bond-constructing units (component B) having a group represented by the formula (1).

Such a polycarbonate resin can be obtained, for example, by a method in which a bisphenolic compound represented by the formula (1') is copolymerized with a bisphenolic compound having at least one suspending aromatic group, such as the one represented by the formula (2'), under the conditions satisfying the specified requirements of the present invention. The polycarbonate resin can also be obtained by a method in which a bisphenolic compound represented by the formula (2') and a bisphenolic compound represented by the formula (1') are reacted respectively with phosgene to obtain the corresponding polycarbonates and these polycarbonates are mixed in the manner satisfying the requirements of the present invention.

More specifically, for producing a polycarbonate resin containing both component A and component B, a bisphenolic compound represented by the formula (1'), a bisphenolic compound represented by the formula (2') and an acid receptor such as an aqueous alkaline solution or pyridine are put into an inert (inactive) solvent such as methylene chlorided, 1,2-dichloromethane or the like, and phosgene is introduced into the solution for carrying out reaction.

In case where an aqueous alkaline solution is used as acid receptor, the reaction rate can be elevated by using a tertiary amine such as trimethylamine or triethylamine or a quaternary ammonium compound such as tetrabutylammonium chloride or benzyltributylammonium bromide as catalyst. If necessary, a monovalent phenol such as a phenol or p-tertiary butylphenol may be introduced as a molecular weight modifier.

The reaction temperature is in a range of 0° to 100° C.

The catalyst may be allowed to exist from the beginning of the reaction or it may be added in the course of the reaction, for example, after formation of the oligomer, to promote the polymerization reaction.

The following methods may be employed for copolymerizing the bisphenolic compounds of the formulae (1') and (2'):

(a) Both compounds are allowed to exist in the reaction system from the beginning and reacted simultaneously with phosgene.

(b) One of the compounds is first reacted with phosgene, and after the reaction has advanced to a certain extent, the other compound is added and polymerized.

(c) The compounds are reacted separately with phosgene to prepare the corresponding oligomers, and these oligomers are mixed and further reacted for polymerization.

For mixing the oligomers obtained from separate polymerization of the compounds, any suitable methods can be employed, such as a method in which the respective oligomers in a powdery or granular form are mixed and reduced into a molten state by an extractor, kneader, mixing roll or other means, followed by further mixing, or a solution blending method.

The polycarbonate resin used in the present invention is composed of the component A and the component B. The content of the component A is 100 to 0 wt % and the content of the component B is 0 to 100 wt %. The preferable content of the component A is 90 to 10 wt % and the preferable content of the component B is 10 to 90 wt %. Also, it is preferred that the content of the component A is 20 to 0 wt % and the content of the component B is 80 to 100 wt %.

The average molecular weight of the polycarbonate resin used in the present invention is in a range of 10,000 to 20,000. The "average molecular weight" referred to in the present invention designates the value determined from the following equations based on ηsp measured at 20° C. using a methylene chloride solution of 6.0 g/liter of the polymer:

$$\eta sp/c = [\eta](1 + K'\eta sp) \quad (4)$$

$$[\eta] = KM^\alpha \quad (5)$$

wherein c is polymer concentration (g/l), [η] is intrinsic viscosity, K'=0.28, K=1.23×10$^{-5}$, α=0.83, and M is average molecular weight.

When the average molecular weight of the polycarbonate resin used in the present invention is less than 10,000, the produced substrate is unsatisfactory in strength and tends to crack in use. When the average molecular weight exceeds 20,000, the optical anisotropy by orientation of the molecular chain increases, and especially lateral birefringence increases due to the increase of the skin layer. The preferred range of the average molecular weight of the polycarbonate resin is from 12,000 to 17,000.

Figure 11:
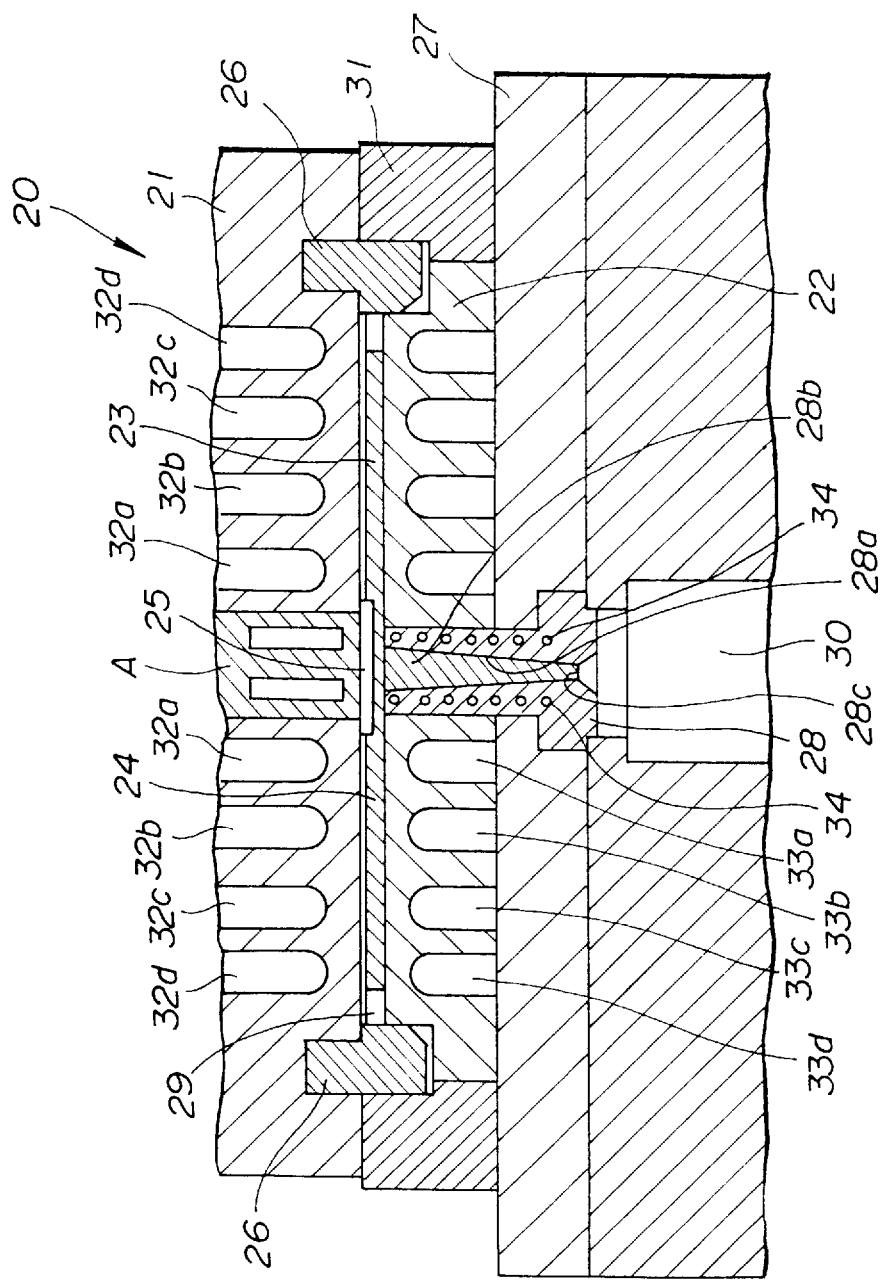
FIG. 11 is a schematic illustration of the device used for injection compression molding in the present invention.

A schematic illustration of the apparatus used for injection compression molding in the present invention is given in FIG. 11.

The molding device 20 comprises a moving-side mold 21 and a stationary-side mold 22. An optical recording medium master 24 for replicating prepits and grooves to the surface of a substrate 23 is secured to the moving-side mold 21 by the inner and outer peripheral fixtures 25 and 26. The stationary-side mold 22 is mounted on a fixed plate 27 and has a sprue 28 at its center. The center of the sprue 28 is formed a resin introducing passage 28a, with one end 28b thereof opening into a cavity 29 formed between the molds 21 and 22 while the other end 28c connects to an injection nozzle 30. The stationary-side mold 22 is secured to the fixed plate 27 by a mold holder 31 disposed at the outer periphery and secured to the fixed plate 27.

The moving-side mold 21 and stationary-side mold 22 are provided with temperature adjusting channels 32a–32d and 33a–33d as shown in FIG. 11, whereby the temperatures of the radially inside portion (inner peripheral portion) and the radially outside portion (outer peripheral portion) of the molds 21, 22 are adjusted. In the sprue 28 is also formed a coolant passage 34 so as to surround the central resin feed passage 28a.

This injection compression molding process is usually divided into at least three steps.

In the first step, the molten resin is filled in the cavity. This step is completed in less than one second as it is finished before the resin temperature lowers to retard resin flow.

In the second step, the fine pattern on the optical recording medium master is replicated to the molded resin surface. This step is usually completed in 0.5 to 2 seconds.

In the third step, the molded resin is cooled. When the mold temperature is still high, if the mold substrate is suddenly taken out from the mold, the mold substrate tends to deform since the molded substratew has a temperature close to the glass transition point (Tg). For example, when the molded substrate is removed from the mold by sucking the central part of the substrate, the substrate may be warped even by a small hook (necessary for preventing the molding from dropping out when the mold is opened).

The mold temperature (Tmo) is in a range defined by:

$$Tg-40° C. \leq Tmo \leq Tg-10° C.$$

wherein Tg is the glass transition point of the resin as measured by a differential scanning calorimeter.

When the mold temperature (Tmo) is below Tg–40° C., formation of the skin layer on the substrate surface is promoted to enlarge lateral birefringence, resulting in bad replication. When the mold temperature (Tmo) is not less than Tg–10° C., the substrate is taken out in a soft state from the mold, resulting in poor mechanical properties of the obtained substrate.

The preferred range of mold temperature (Tmo) is:

$$Tg-35° C. \leq Tmo \leq Tg-15° C.$$

It is difficult to directly measure the surface temperature of the mold, so that the temperature of cooling water was measured and it was here given as mold temperature (Tmo).

The cooling time (tc [sec]) in the third step is in a range of:

$$-0.1 \times (Tg-Tmo) + 6 \leq tc \leq -0.33 \times (Tg-Tmo) + 20.$$

When the cooling time (tc) is less than –0.1×(Tg–Tmo)+6, the substrate tends to deform, resulting in the deteriorated mechanical properties such as axial acceleration. When the cooling time (tc) is more than –0.33×(Tg–Tmo)+20, the frozen strain of the resin rises up to increase vertical birefringence and lateral birefringence.

The preferred range of the cooling time (tc) is:

$$-0.075 \times (Tg-Tmo) + 6 \leq tc \leq -0.36 \times (Tg-Tmo) + 20.$$

The molten resin temperature in the present invention is one at which the resin can well maintain its fluidity and is prevented from suffering a change of quality due to decomposition or other causes. For example, in the case of a polycarbonate resin having a molecular weight of around 15,000, its temperature in the molten state is selected from a range of three hundreds and tens ° C. to around 400° C. Since the molten resin temperature is decided with reference to fluidity and heat resistance of the resin, the above range may vary with change of the molecular properties of the resin.

Vertical birefringence can be further lowered by annealing the substrate at a temperature slightly lower than the glass transition point (Tg).

The temperature (Ta) at which the annealing treatment of the substrate after taken out from the mold is carried out is preferably in a range of: Tg–50° C.$\leq$Ta$\leq$Tg–20° C. When the annealing temperature (Ta) is less than Tg−50° C., the reduction of vertical birefringence is not enough. When the annealing temperature (Ta) is more than Tg−20° C., the substrate tends to deform and deteriorate in mechanical properties. Lateral birefringence at the inner peripheral portion is also increased.

The more preferred range of the annealing temperature (Ta) is: Tg−45° C.≦Ta≦Tg−25° C.

Annealing is conducted for the purpose of relaxing optical strain caused by cooling during molding or removing moisture absorbed by the substrate. It may be performed immediately after molding or after passage of a pertinent number of days after molding. In either case, it is preferably carried out before forming the recording layer by sputtering or other means on the substrate.

By the above process, there can be obtained a substrate in which the absolute value (vertical birefringence) of the difference between the refractive index in the direction parallel to the substrate plane and that in the direction vertical to the substrate plane is not more than $450 \times 10^{-6}$.

The glass transition point (Tg) is the inflexion point of a heat-up curve (absorbed heat quantity/temperature) as determined when the resin was once heated at a rate of 16° C./min, and after rapid cooling, again heated at a rate of 16° C./min by using a differential scanning calorimeter.

In injection molding, addition of a phosphite ester in an amount of 0.01 to 2 wt % based on the polycarbonate resin is recommendable as it is helpful for suppressing tinting or reduction of transparency of the resin due to decomposition.

The phosphite esters usable for the purpose include tributyl phosphite, tris(2-ethylhexyl) phosphite, tridecyl phosphite, tristearyl phosphite, triphenyl phosphite, tricredyl phosphite, 2-ethylhexyldiphenyl phosphite, decyldiphenyl phosphite, tricyclohexyl phosphite and distearylpentaerythrityl diphosphite.

Incorporation of a phosphite ester can be effected by a suitable method, such as dry blending, melt mixing in the course of pelletizing by an extruder, or a method in which master pellets with a high phosphite ester concentration are prepared and dry blended with the pellets containing no phosphite ester.

According to the optical recording medium of the present invention, since no medium information track is exists in the control track region on the outside of the user track region, there is no possibility that the optical recording medium recording and reading-out device should misread the control track region. Also, since the grooves are uniform throughout the track region, there can be obtained sufficient tracking signals, and by the employment of MCAV system, outer periphery expansion system and PWM system, it is possible to increase the recording capacity of the optical recording medium. Further, the substrate obtained according to the process of the present invention suffers little warpage and is minimized in optical distorsion such as birefringence, so that it is suited for use as substrate for short-wavelength optical recording medium.

EXAMPLES

The present invention is described in further detail below with reference to the examples, which examples, however, are merely intended to be illustrative and not to be construed as limiting the scope of the invention.

Example 1

FIG. 1 is a diagrammatic illustration of an optical recording medium according to the present invention.

The outer diameter of this optical recording medium is, for example, 85.5–86 mm, and there are formed, for example, 16,500 spiral grooves. Also in this optical recording medium (n+1) (e.g. n=19) zones from A0 to An are formed from the inner side toward the outer side of the medium. The innermost peripheral zone begins, for example, at a radius of 23.1 mm, and the outermost peripheral zone ends, for example, at a radius of 41.3 mm. The track pitch may be, for example, 1.1 $\mu$m.

In the innermost peripheral zone A0, each track is partitioned into m (e.g. m=48) sectors from 0 to m−1 in the circumferential direction of the track. The number of the sectors per track increases by two from the inner zone to the outer zone. In the outermost peripheral zone, however, the number of the sectors per track is the same as in the adjacent zone just inside thereof. In the outermost peripheral zone An, there are formed (2×n+m−2)(e.g. 84) sectors per track.

The number of the tracks formed in the respective zones are different. For example, 525 tracks are formed in the zone A0, 875 tracks are formed in each of the zones Ai to An-2, 825 tracks are formed in the zone An-1, and 275 tracks are formed in the zone An. The zones Ai to An-1 are used as a user track region, the zone A0 is used as a control track region having the medium information tracks on the inside of the user track region, and the zone An is used as a control track region having no medium information track on the outside of the user track region.

The capacity of each sector is, for example, 778 bytes. Since the maximum recording capacity of one sector is, for example, 512 bytes, the recording capacity of the whole user track region is approximately 538 megabytes (MB). Since one byte is converted to 12 channel bits by, for example, (1,7) RLL (Run Length Limited) conversion, each sector has a capacity of 9,336 channel bits.

On the optical recording medium, prepits are recorded according to the PWM system. The minimum mark length of the prepits is about 0.64 $\mu$m in each zone excepting the outermost peripheral zone.

Regarding each track in the track region, basically an address information of the sector is recorded in the form of prepits at the head of each sector, and this portion is called header region. The length of the header region is, for example, 63 bytes.

In the remaining portion (e.g. 715-byte portion) of the sector, there exists no prepit, and a substantially flat surface is provided between every adjoining grooves. The portion (e.g. 698-byte portion) succeeding the header region is called data region. In a track where information has been recorded by prepits, information is recorded in the form of prepits in the data region.

Example 2

Figure 2:
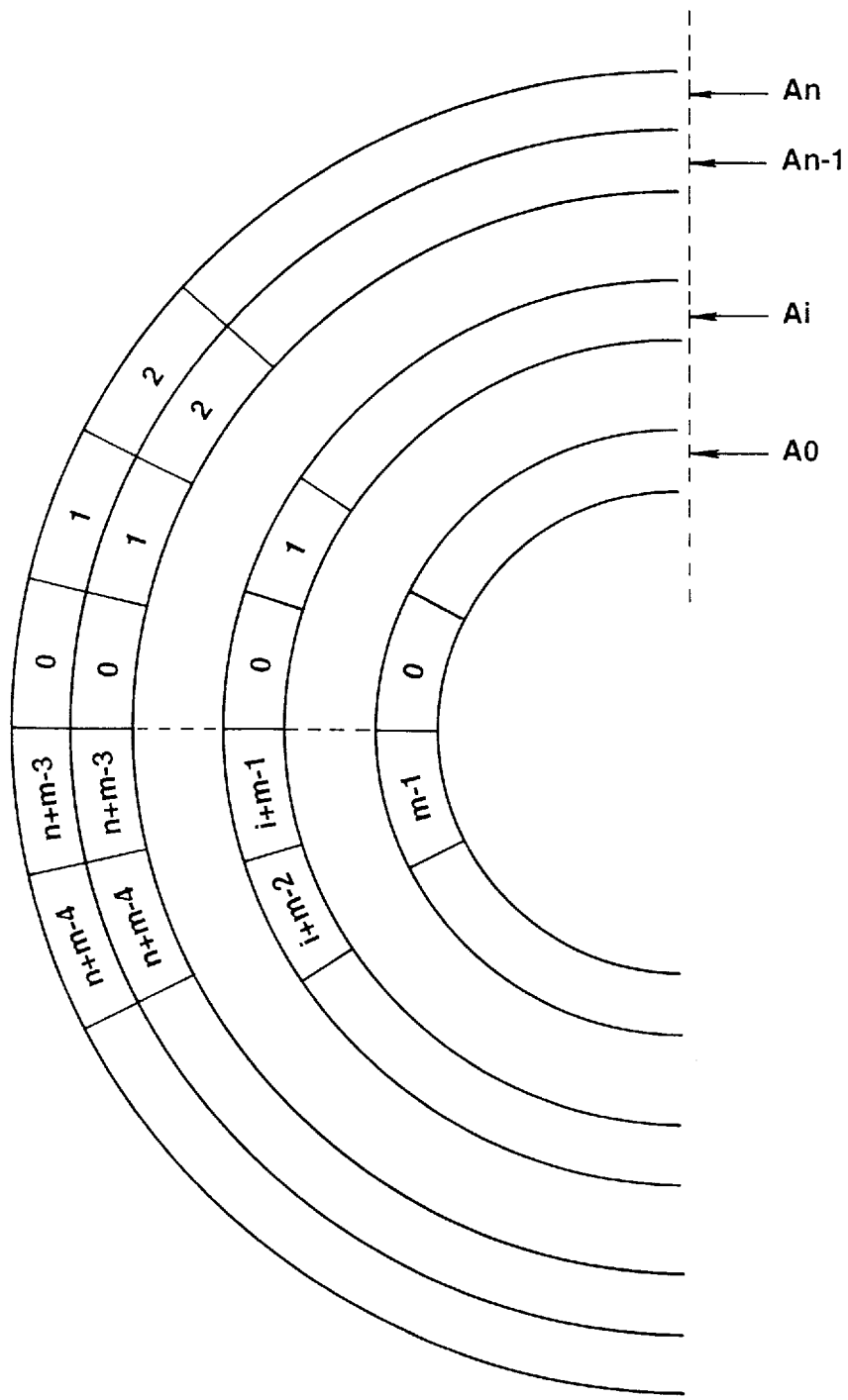
FIG. 2 is a diagrammatic illustration of the optical recording medium of Example 2.

FIG. 2 is a diagrammatic illustration of another optical recording medium according to the present invention.

The outer diameter of this optical recording medium is, for example, 85.5–86 mm and there are formed, for example, 16,524 spiral grooves. Also, in this optical recording medium (n+1) (e.g. n=11) zones from A0 to An are formed from the inner side toward the outer side of the medium. The innermost peripheral zone begins, for example, at a radius of 23.1 mm and the outermost peripheral zone ends, for example, at a radius of 41.3 mm. The track pitch may be, for example, 1.1 $\mu$m.

In the innermost peripheral zone A0, each track is partitioned into m (e. g. m=15) sectors from 0 to m−1 in the circumferential direction of the track. The number of the sectors per track increases by one from the inner zone to the outer zone. In the outermost peripheral zone, however, the number of sectors per track is the same as in the adjacent zone just inside thereof. In the outermost peripheral zone An, there are formed (n+m−1) (e.g. 25) sectors per track.

The number of the tracks formed in the respective zones are different. For example, 561 tracks are formed in the zone A0, 1,428 tracks are formed in each of the zones Ai to An-1, and 255 tracks are formed in the zone An. The zones Ai to An-1 are used as a user track region, the zone A0 is used a control track region having the medium information tracks on the inside of the user track region, and the zone An is used as a control track region having no medium information track on the outside of the user track region.

The capacity of each sector is, for example, 2,584 bytes. Since the maximum recording capacity of one sector is, for example, 2,048 bytes, the recording capacity of the whole user track region is approximately 643 MB. Since one byte is converted to 12 channel bits by, for example, (1,7) RLL conversion, each sector has a capacity of 31,008 channel bits.

On the optical recording medium, prepits are recorded according to the PWM system. The minimum mark length of the prepits is about 0.64 $\mu$m in each zone excepting the outermost peripheral zone.

Regarding each track in the track region, basically an address information of the sector is recorded in the form of prepits at the head of each sector, and this portion is called header region. The length of the header region is, for example, 63 bytes.

In the remaining portion (e.g. 2,521-byte portion) of the sector, there exists no prepit, and a substantially flat surface is provided between every adjoining grooves. The portion (e.g. 2,498-byte portion) succeeding the header region is called data region. In a track where information has been recorded by prepits, information is recorded in the form of prepits in the data region.

Comparative Example 1

Figure 3:
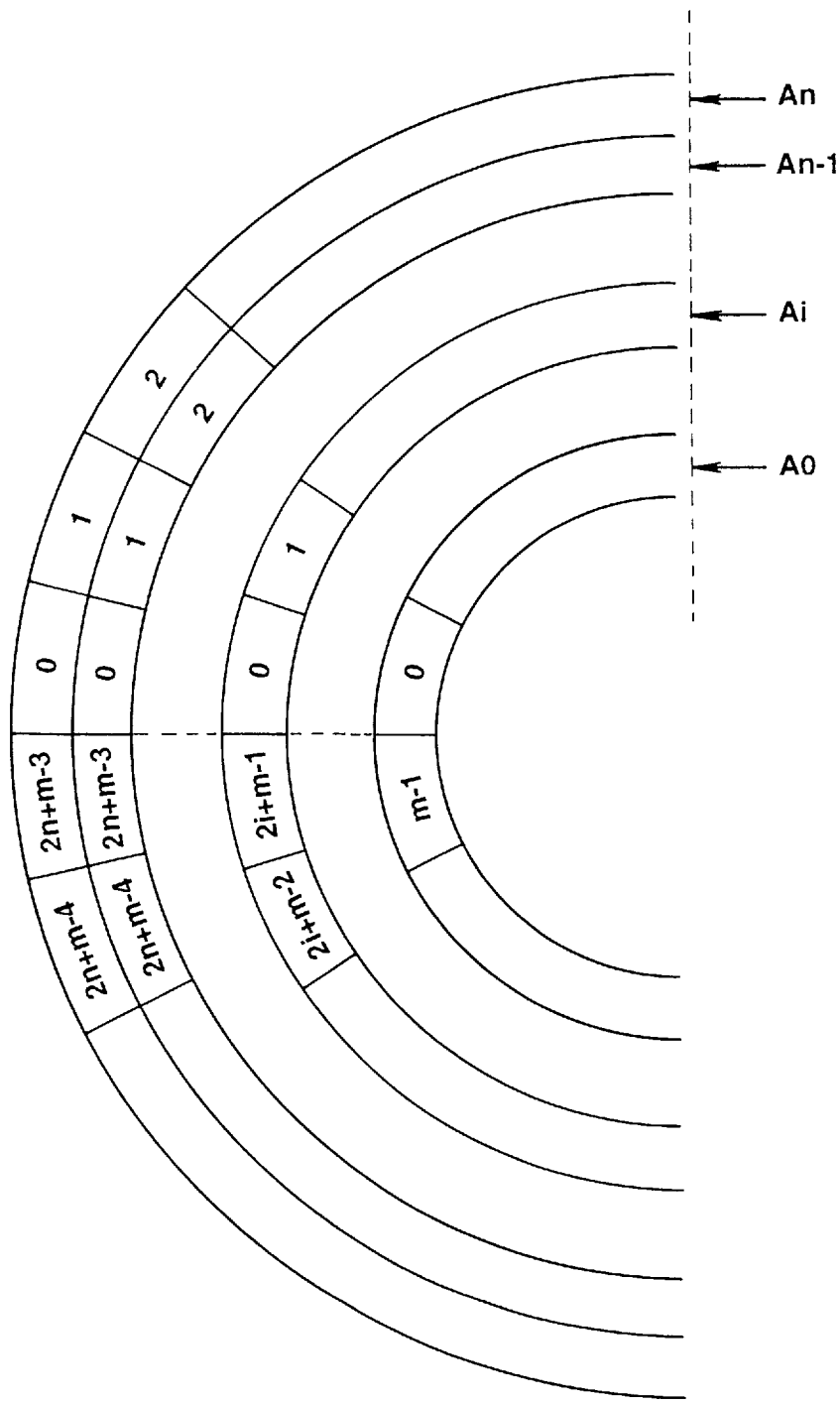
FIG. 3 is a diagrammatic illustration of the optical recording medium of Comparative Example 1.

The optical recording medium illustrated in FIG. 3 is substantially the same as that of Example 1, except that the outermost peripheral zone An is used as a control track region having the medium information tracks on the outside of the user track region.

Comparative Example 2

Figure 4:
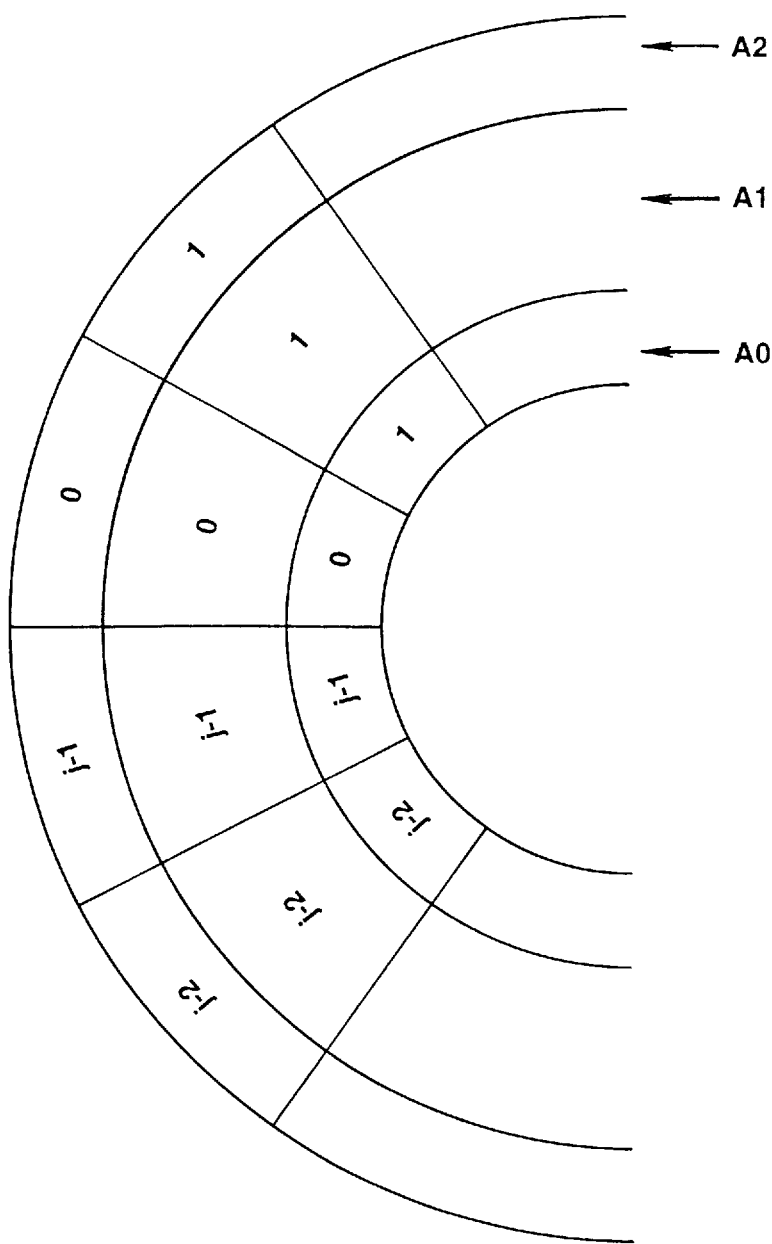
FIG. 4 is a diagrammatic illustration of the optical recording medium of Comparative Example 2.

In the optical recording medium shown in FIG. 4 in which the outer diameter is, for example, 85.5–86 mm, there are formed, for example, 11,313 spiral grooves. Also in this optical recording medium (n+1) (e.g. n=2) zones from A0 to An are formed from the inner side toward the outer side of the medium. The innermost peripheral zone begins, for example, at a radius of 22.9 mm and the outermost peripheral zone ends, for example, at a radius of 41.0 mm. The track pitch may be, for example, 1.6 $\mu$m. In each of the zones A0 to An, each track is partitioned into m (e.g. m=25) sectors 0 to m−1 in the circumferential direction of the track.

The number of the tracks formed in the respective zones are different. For example, 688 tracks are formed in the zone A0, 10,000 tracks are formed in the zone Ai, and 625 tracks are formed in the zone A2. The zone Ai is used as a user track region, the zone A0 is used as a control track region having the medium information tracks on the inside of the user track region, and the zone A2 is used a control track region having the medium information tracks on the outside of the user track region.

The capacity of each sector is, for example, 725 bytes. Since the maximum recording capacity of one sector is, for example, 512 bytes, the recording capacity of the whole user track region is approximately 128 MB. Since one byte is converted to 16 channel bits by, for example, (2,7) RLL conversion, each sector has a capacity of 11,600 channel bits.

On the optical recording medium, prepits are recorded according to the PPM system. The minimum pit interval of the prepits increases proportionally to the radius, and it is about 1.49 $\mu$m at the innermost periphery and about 2.66 $\mu$m at the outermost periphery.

Regarding each track in the track region, basically an address information of the sector is recorded in the form of prepits at the head of each sector, and this portion is called header region. The length of the header region is, for example, 52 bytes.

In the remaining portion (e.g. 673-byte portion) of the sector, there exists no prepit, and a substantially flat surface is provided between every adjoining grooves. The portion (e.g. 661-byte portion) succeeding the header region is called data region. In a track where information has been recorded by prepits, information is recorded in the form of prepits in the data region.

The optical recording medium master was made in the following manner. First, a photoresist was applied on the glass substrate and exposed to laser beams according to the recording system, followed by development to form the grooves and prepits. Then the thus treated substrate surface was subjected to sputtering and electro-forming and the master film was separated from the sputtered surface.

The size of the grooves and prepits varies in accordance with the laser power and the shape of laser beams. In case where exposure is made by turning the glass substrate at a constant speed, the laser power is increased linearly in accordance with the radius so that uniform exposure will be made at the inner and outer peripheries which differ in linear speed.

Laser power for forming the grooves was controlled so that it would be 2.8 mW at a radius of 23.1 mm and would increase by a constant increment of 0.088 in the area from a radius of 23.1 mm to a radius of 41.3 mm at which point the power should be 4.4 mW. Laser power for forming the prepits was controlled so that it would be 4.45 mW at a radius of 23.1 mm and would increase by a constant increment of 0.16 in the area from a radius of 23.1 mm to a radius of 41.3 mm at which point the laser power would be 7.4 mW.

The above treatments were followed by development, sputtering and electro-forming to obtain an optical recording medium master. The thus obtained optical recording medium masters of Example 1, Example 2, Comparative Example 1 and Comparative Example 2 are hereinafter called optical recording medium master B, optical recording medium master D, optical recording medium master E and optical recording medium master F, respectively, and the optical recording media produced from the respective masters are called optical recording medium B, optical recording medium D, optical recording medium E and optical recording medium F, respectively.

In another embodiment, laser power for forming the grooves was controlled, so that it would be 2.8 mW at a radius of 23.1 mm and would increase by a constant increment of 0.088 in the area from a radius of 23.1 mm to a radius of 39 mm at which point the laser power would be 4.2 mW. From the radius of 39 mm outwards, the power increment factor was changed to a greater factor of 0.176, the laser power would be increased by this factor radially, and it would be 4.6 mW at a radius of 41.3 mm. Laser power for forming the prepits was controlled so that it would be 4.45 mW at a radius of 23.1 mm and would increase by a constant increment of 0.16 in the area from a radius of 23.1 mm to a radius of 39 mm at which point the laser power would be 7.0 mW. From the radius of 39 mm outwards, the power increment factor was changed to a greater factor of 0.32, the laser power would be increased by this factor radially, and it would be 7.8 mW at a radius of 41.3 mm.

The above treatments were followed by development, sputtering and electro-forming to obtain an optical recording medium master. The thus obtained optical recording medium masters of Example 1 and Example 2 are called optical recording medium master A and optical recording medium master C, respectively, and the optical recording media produced from the respective masters are called optical recording medium A and optical recording medium C, respectively.

The processes for preparing the samples of polycarbonate resin used in the present invention are shown below as Preparation Examples. The properties of the substrates produced form injection compression molding of the obtained samples of polycarbonate resin are also shown below.

In the following Preparation Examples, all the "parts" showing the amounts of the respective components are by weight unless otherwise noted. Glass transition point (Tg) was determined by a Du Pont's differential scanning calorimeter.

Preparation Example 1
(a) Preparation of polycarbonate oligomer
   16.6% solution of bisphenol A sodium salt prepared by dissolving bisphenol A in a sodium hydroxide solution 100 parts
   P-tertiary butylphenol 0.23 part
   Methylene chloride 40 parts
   Phosgene 7 parts A mixture of the above composition was supplied quantitatively to a vibration-reactor to carry out interfacial polymerization. The reaction mixture was separated into the different liquid phases and only the methylene chloride solution containing a polycarbonate oligomer was collected.

An analysis of the obtained methylene chloride solution of oligomer gave the following results:
   Oligomer concentration 21.6 wt % (Note 1)
   Terminal chloroformate group concentration 0.25N (Note 2)
   Terminal phenolic hydroxyl group concentration 0.053N (Note 3)

The oligomer solution of component B obtained in the manner described above is hereinafter referred to as oligomer solution B.

Note 1: Measured after evaporating the solution to dryness.
Note 2: The aniline hydrochloride obtained from a reaction with aniline was subjected to neutralization titration with a 0.2N sodium hydroxide solution.
Note 3: Color development which occurred when the oligomer was dissolved in a titanium tetrachloride and acetic acid solution was determined colorimetrically at 546 nm.

(b) Preparation of polycarbonate
   Oligomer solution B 160 parts
   P-tertiary butylphenol 1.1 part
   Methylene chloride 130 parts A mixture of the above composition was supplied into a reactor equipped with a stirrer and stirred at 550 r.p.m. Then an aqueous solution of the following composition:
   16.6 wt % solution of bisphenol A sodium salt 80 parts
   25 wt % solution of sodium hydroxide 8 parts
   2 wt % solution of triethylamine 1 part
was added to carry out interfacial polymerization for 7 hours. The reaction mixture was separated into the differnt liquid phases and the methylene chloride solution containing a polycarbonate was washed with water, a hydrochloric acid solution and water in that order. Finally methylene chloride was evaporated away and the produced resin was taken out of the reactor.

The viscosity-average molecular weight of this resin was 15,000.

The composition and properties of the thus obtained polycarbonate are shown in Table 1.

Preparation Example 2
(a) Preparation of polycarbonate oligomer
   1,1-bis(4-hydroxyphenyl)-1-phenylethane 100 parts
   Sodium hydroxide 40 parts
   Water 600 parts
   Methylene chloride 375 parts A mixture of the above composition was supplied into a reactor equipped with a stirrer and stirred at 800 r.p.m. Then, 57 parts of phosgene was blown through the reaction mass for one hour to perform interfacial polymerization. After the reaction was completed, only the methylene chloride solution containing a polycarbonate oligomer was collected. An analysis of the obtained methylene chloride solution containing the oligomer gave the following results:
   Oligomer concentration 20.3 wt % (Note 1)
   Terminal chloroformate group concentration 0.18N (Note 2)
   Terminal phenolic hydroxyl group concentration 0.058N (Note 3)

The thus obtained oligomer solution of component A is hereinafter referred to as oligomer solution A.

(b) Preparation of polycarbonate
   Oligomer solution A 140 parts
   P-tertiary butylphenol 0.73 part
   Methylene chloride 80 parts A mixture of the above composition was supplied into a reactor equipped with a stirrer and stirred at 200 r.p.m. Then an aqueous solution of the following composition:
   4.0 wt % solution of sodium hydroxide 40 parts
   2 wt % solution of triethylamine 0.27 part
was added to carry out interfacial polymerization for 7 hours. The reaction mixture was separated into the different liquid phases and the methylene chloride solution containing a polycarbonate was washed with water, a hydrochloric acid solution and water successively in that order. Finally methylene chloride was evaporated away and the produced resin was taken out of the reactor.

The viscosity-average molecular weight of this resin was 13,700.

(c) Preparation of polycarbonate
   Oligomer solution B 160 parts p1 P-tertiary butylphenol 1.3 part
   Methylene chloride 130 parts
   16.6 wt % solution of bisphenol A sodium salt 80 parts 25 wt % solution of sodium hydroxide 8 parts 2 wt % solution of triethylamine 1 part A mixture of the above composition was subjected to interfacial polymerization and washing in the same way as in Preparation Example 1 to obtain a resin.

The viscosity-average molecular weight of this resin was 13,700.

(d) Preparation of polycarbonate 15 parts of the resin obtained according to (b) and 85 parts of the resin obtained according to (c) were mixed at 310° C. using a twin-screw extruder.

The viscosity-average molecular weight of this mixture was 13,700.

NMR analysis of the mixture confirmed that the amount of the carbonate bond-constructing units associated with bisphenol A contained in the mixture was 84.5 wt % based on the whole carbonate bond constituting units. The composition and properties of the obtained polycarbonate are shown in Table 1.

Preparation Example 3

(a) Preparation of polycarbonate 25 parts of the resin having a viscosity-average molecular weight of 13,700 obtained according to (b) of Preparation Example 2 from the oligomer solution A and 75 parts of the resin having a viscosity-average molecular weight of 13,700 obtained according to (c) of Preparation Example 2 from the oligomer solution B were mixed.

The viscosity-average molecular weight of the obtained resin was 13,700.

NMR analysis of the resin confirmed that the amount of the carbonate bond-constructing units associated with copolymerized bisphenol A was 72.9 wt % based on the whole carbonate bond-constructing units. The composition and properties of the obtained polycarbonate are shown in Table 1.

Preparation Example 4

(a) Preparation of polycarbonate 55 parts of the resin having a viscosity-average molecular weight of 12,300 obtained by interfacial polymerization according to (b) of Preparation Example 2 from the oligomer solution A and 45 parts of the resin obtained according to (c) of Preparation Example 2 from the oligomer solution B were mixed.

The viscosity-average molecular weight of the obtained resin was 12,800.

NMR analysis of this resin confirmed that the amount of the carbonate bond-constructing units associated with copolymerized bisphenol A was 44.0 wt % based on the whole carbonate bond-constructing units. The composition and properties of the obtained polycarbonate are shown in Table 1.

Preparation Example 5

(a) Preparation of polycarbonate 55 parts of the resin having a viscosity-average molecular weight of 13,700 obtained by interfacial polymerization according to (b) of Preparation Example 2 from the oligomer solution A and 45 parts of the resin having a viscosity-average molecular weight of 13,700 obtained according to (c) of Preparation Example 2 from the oligomer solution B were mixed.

The viscosity-average molecular weight of the obtained resin was 13,400.

NMR analysis of the resin confirmed that the amount of the carbonate bond-constructing units associated with copolymerized bisphenol A was 44.1 wt % based on the whole carbonate bond-constructing units. The composition and properties of the obtained polycarbonate are shown in Table 1.

Preparation Example 6

(a) Preparation of polycarbonate 55 parts of the resin having a viscosity-average molecular weight of 15,400 obtained by interfacial polymerization according to (b) of Preparation Example 2 from the oligomer solution A and 45 parts of the resin obtained according to (c) of Preparation Example 2 from the oligomer solution B were mixed.

The viscosity-average molecular weight of the obtained resin was 14,200.

NMR analysis of the resin confirmed that the amount of the carbonate bond-constructing units associated with copolymerized bisphenol A was 44.1 wt % based on the whole carbonate bond-constructing units. The composition and properties of the obtained polycarbonate are shown in Table 1.

Preparation Example 7

(a) Preparation of polycarbonate 75 parts of the resin having a viscosity-average molecular weight of 13,700 obtained by interfacial polymerization according to (b) of Preparation Example 2 from the oligomer solution A and 25 parts of the resin obtained according to (c) of Preparation Example 2 from the oligomer solution B were mixed.

The viscosity-average molecular weight of the obtained resin was 13,200.

NMR analysis of the resin confirmed the amount of the carbonate bond-constructing units associated with copolymerized bisphenol A was 24.6 wt % based on the whole carbonate bond-constructing units. The composition and properties of the obtained polycarbonate are shown in Table 1.

Preparation Example 8

(a) Preparation of polycarbonate

Oligomer solution A 140 parts

P-tertiary butylphenol 0.75 part

Methylene chloride 80 parts

A mixture of the above composition was supplied into a reactor equipped with a stirrer and stirred at 200 r.p.m. Then an aqueous solution of the following composition:

4.0 wt % solution of sodium hydroxide 40 parts 2 wt % solution of triethylamine 0.05 part was added to carry out interfacial polymerization for 7 hours. The reaction mixture was separated into the different liquid phases, and the methylene chloride solution containing a polycarbonate was washed with water, a hydrochloric acid solution and water successively in that order. Finally methylene chloride was evaporated away and the produced resin was taken out of the reactor.

The viscosity-average molecular weight of the obtained resin was 13,000. The composition and properties of the obtained polycarbonate are shown in Table 1.

Preparation Example 9

(a) Preparation of polycarbonate 8 parts of the resin obtained according to (b) of Preparation Example 2 and 92 parts of the resin obtained according to (c) of Preparation Example 2 were mixed at 310° C. using a twin-screw extruder.

The viscosity-average molecular weight of this mixture was 13,500.

NMR analysis of the mixture confirmed that the amount of the carbonate bond-constructing units associated with copolymerized bisphenol A was 90.4 wt % based on the whole carbonate bond-constructing units. The composition and properties of the obtained polycarbonate are shown in Table 1.

Comparative Preparation Example 1
(a) Preparation of polycarbonate

Oligomer solution A 110 parts

Oligomer solution B 90 parts

Methylene chloride 50 parts

P-tertiary butylphenol 1.77 parts

Water 40 parts 25 wt % solution of sodium hydroxide 45 parts 2 wt % solution of triethylamine 1.9 parts A mixture of the above composition was subjected to interfacial polymerization and washing in the same way as in Preparation Example 1 to obtain a resin.

The viscosity-average molecular weight of this resin was 9,500.

NMR analysis of the resin confirmed that the amount of the carbonate bond-constructing units associated with copolymerized bisphenol A was 44.7 wt % based on the whole carbonate bond-constructing units. The composition and properties of the obtained polycarbonate are shown in Table 1.

Comparative Preparation Example 2
(a) Preparation of polycarbonate

Oligomer solution A 110 parts

Oligomer solution B 90 parts

Methylene chloride 50 parts

P-tertiary butylphenol 0.94 part

Water 40 parts 25 wt % solution of sodium hydroxide 45 parts 2 wt % solution of triethylamine 1.9 parts A mixture of the above composition was subjected to interfacial polymerization and washing in the same way as in Preparation Example 1 to obtain a resin.

The viscosity-average molecular weight of the obtained resin was 22,500.

NMR analysis of the rein confirmed that the amount of the carbonate bond-constructing units associated with copolymerized bisphenol A was 44.5 wt % based on the shole carbonate bond units. The composition and properties of the obtained polycarbonate are shown in Table 1.

Comparative Preparation Example 3
(a) Preparation of polycarbonate

Oligomer solution 160 parts

P-tertiary butylphenol 0.9 part

Methylene chloride 130 parts

A mixture of the above composition was supplied into a reactor equipped with a stirrer and stirred at 550 r.p.m. Then an aqueous solution of the following composition:

16.6 wt % solution of bisphenol A sodium salt 80 parts 25 wt % solution of sodium hydroxide 8 parts 2 wt % solution of triethylamine 1 part was added to carry out interfacial polymerization was carried out for 7 hours. The reaction mixture was separated into the different liquid phases and the methylene chloride solution containing a polycarbonate was washed with water, a hydrochloric acid solution and water successively in that order. Finally methylene chloride was evaporated away and the produced resin was taken out of the reactor.

The viscosity-average molecular weight of the obtained resin was 21,000. The composition and properties of the obtained polycarbonate are shown in Table 1.

Work Examples 1–11 and Comparative Work Examples 1–5

Using the optical recording medium master B, 86 mm φ and 1.2 mm-thick substrates were molded under the conditions shown in Table 2 using an injection compression molding machine DISC 5AM3 (trade name, manufactured by Sumitomo Heavy Machinery Co., Ltd.).

Regarding pressure control in injection compression molding, with pressure expressed per unit area of the substrate, there was applied a pressure of 393 kg/cm$^2$ for 1.2 seconds in the first step where the molten resin was filled in the cavity to the second step where the resin was compressed to replicate the fine pattern on the optical recording medium master, and a pressure of 196 kg/cm$^2$ was applied in the third step where the molded resin was cooled.

The properties of the obtained substrate are shown in Table 2.

Work Examples 12 and 13

The substrates obtained in Work Examples 5 and 6 were annealed at 120° C. for one hour using an oven DF-62 (trade name, manufactured by Yamato Kagaku Co., Ltd.).

The results are shown in Table 2. The annealed substrates were improved in both lateral birefringence and vertical birefringence in comparison with the substrates before annealing.

The properties of the obtained substrates are shown in Table 2.

Work Examples 14–17 and Comparative Work Examples 6–10

Using the optical recording medium master B, 86 mm φ and 1.2 mm-thick substrates were molded under the conditions shown in Table 3 using DISC 5AM3 (trade name, manufactured by Sumitomo Heavy Machinery Co., Ltd.).

Regarding pressure control in injection compression molding, with pressure expressed per unit area of the substrate, there was applied a pressure of 393 kg/cm$^2$ for 1.2 seconds in the first step where the molten resin was filled in the cavity to the second step where the resin was compressed to replicate the fine pattern on the optical recording medium master, and a pressure of 196 kg/cm$^2$ was applied in the third step where the molded resin was cooled.

The obtained substrates were annealed at the temperatures and for the periods shown in Table 3 using an oven DF-62 (trade name, manufactured by Yamato Kagaku Co., Ltd.).

The properties of the obtained substrates are shown in Table 3.

For the evaluation of the substrates, there were selected four points, 5 mm apart from each other, along a radial line from a radius of 25 mm to a radius of 40 mm of each 86 mm φ substrate.

Regarding lateral birefringence and vertical birefringence, the maximum and the minimum values were shown. An automatic birefringence measuring device ADR-130N (trade name, manufactured by ORC Co., Ltd.) was used for the measurement of birefringence.

The mechanical properties of the substrates were evaluated according to the current optical disc standards (ISO/IEC 13549). The samples which cleared the standards with a sufficient margin were marked with ○, those which could barely cleared the standards were marked with Δ, and those below standards were marked with ×.

It is seen that the substrates obtained according to the process of the present invention suffer little warpage and are also minimized in optical distorsion such as birefringence. These substrates are suited for application to short-wavelength optical recording media.

As the desired resin and the optimal injection compression molding conditions could be obtained, now the influence by the difference in the method of recording by the optical recording medium is evaluated.

First, replication of grooves in the optical recording medium B is evaluated.

DPP signal uniformity was adopted as an index for evaluation of replication. DPP signal uniformity is a factor concerning the size of the grooves. Since the size of the grooves in the optical recording medium master B is substantially uniform in the inner and outer peripheries, replication can be evaluated by DPP signal uniformity. For stable tracking of the optical head on a specific track, the value of DPP signal uniformity needs to be not less than 0.70.

Figure 5:
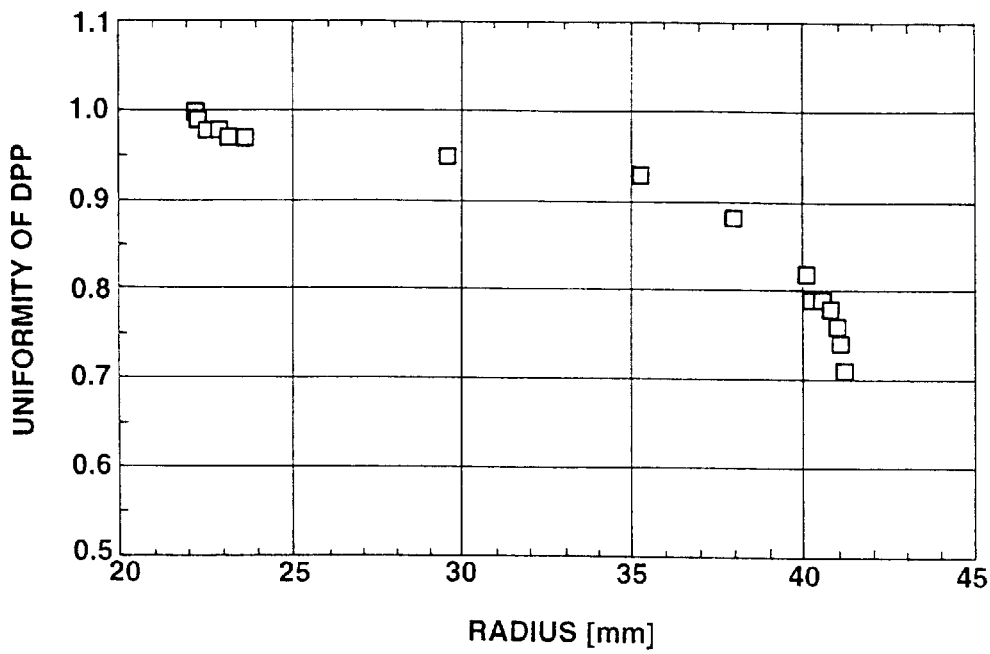
FIG. 5 is a graph showing dependency of DPP signal uniformity in the radial direction in the optical recording medium B.

FIG. 5 is a graph showing dependency of DPP signal uniformity in the radial direction in the optical recording medium B. As is seen from FIG. 5, DPP signal uniformity drops gradually from the inner periphery toward the outer periphery, and its drops greatly in the area outside a radius of 39 mm and drops sharply in the area outside a radius of 41 mm. In the outermost periphery (with a radius of 41.3 mm) of the track region, DPP signal uniformly barely exceeds 0.70. If the outermost periphery of the track region is within a radius of 41.3 mm, stable tracking of the optical head on a specific track of the optical recording medium is possible.

Now, the influence by the presence or absence of the medium information tracks in the control track region on the outside of the user track region is compared between the optical recording medium B and the optical recording medium E.

Figure 6:
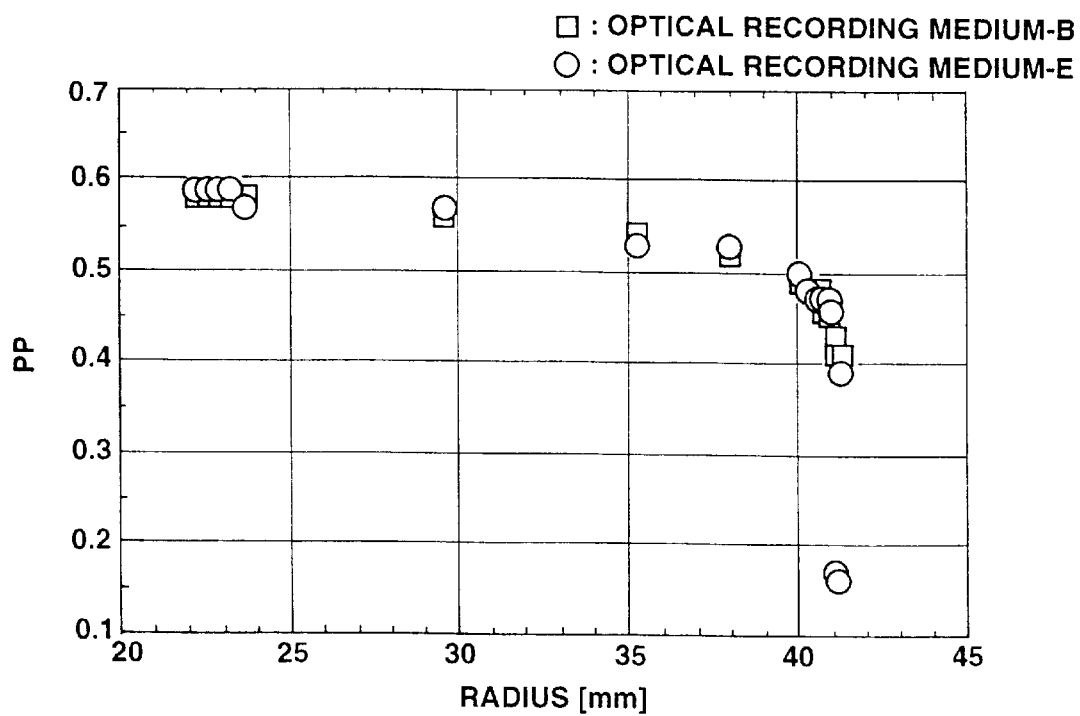
FIG. 6 is a graph showing dependency of PP signal in the radial direction in the optical recording medium B and the optical recording medium E.

FIG. 6 is a graphic showing dependency of PP signal in the radial direction in the optical recording B and the optical recording medium E.

For stable tracking of the optical head on a specific track, the value of PP signal needs to be between 0.15 and 0.65 in the medium information tracks and between 0.40 and 0.65 in other tracks.

It is seen that in the optical recording medium B, PP signal is in a range of 0.43 to 0.58 and stable tracking of the optical head on a specific track is possible. In the case of the optical recording medium E, in the area on the outside of the user track region, that is, in the area on the inside of the medium information track in the control track region located outside a radius of 41.0 mm, PP signal is in a range of 0.46 to 0.59 and stable tracking is possible, but in the medium information tracks, PP signal drops to 0.16 to 0.17, so that stable tracking become possible and also there is little margin. In the area on the outside of the medium information track in the control track region, PP signal rises to 0.39 but it is hardly possible to perform stable tracking.

In the medium information tracks in the control track region on the outside of the user track region of the optical recording medium E, there could be obtained the lowest level of PP signal for stable tracking of the optical head on a specific track. However, in mass production of the medium, it is inevitable that PP signal should vary from medium to medium, and it is quite probable that a substantial percentage of the produced optical recording media would drop below the lower threshold value of PP signal. Therefore, mere obtainment of the lowest allowable level of PP signal is unsatisfactory for practical use of the medium.

Thus, when the medium information tracks exist on the control track region on the outside of the user track region as in the optical recording medium E, it is impossible to perform stable tracking.

Now, recording capacity is compared among the optical recording medium B, the optical recording medium D and the optical recording medium F. The optical recording medium B and the optical recording medium D, as compared with the optical recording medium F, are diminished in track pitch, employ MCAV system, also employ PWM system in place of PPM system and further employ outer peripheral enlargement system, so that the recording capacity of the whole user track region is increased to about 538 MB in the optical recording medium B and about 643 MB in the optical recording medium D from about 128 MB of the optical recording medium F. Thus, in the case of the optical recording medium B, its recording capacity is increased as much as 4.2 times that of the optical recording medium F. In the case of the optical recording medium D, its recording capacity is about 643 MB, which is almost equal to the recording capacity of the compact discs (CD-ROM) which are widely used at present. It is thus expected that this recording medium would be used widely in the future, including substitution for CD-ROM.

Figure 7:
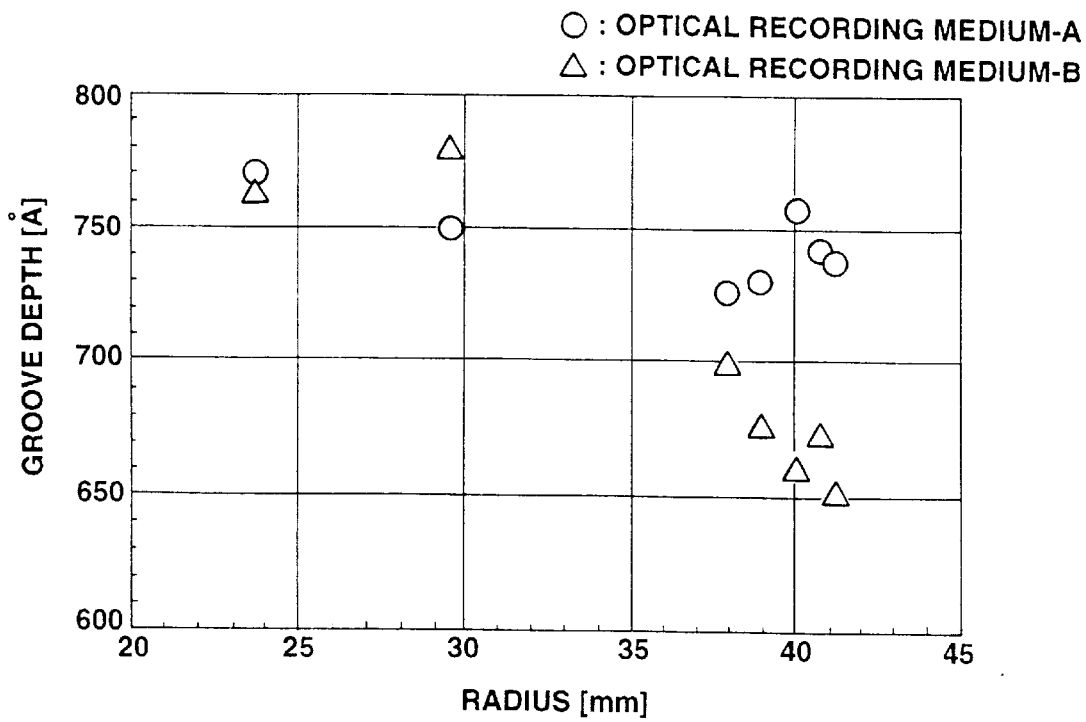
FIG. 7 is a graph showing dependency of the groove depth of the substrate in the radial direction in the optical recording medium A and the optical recording medium B.

FIG. 7 is a graph showing dependency of the groove depth of the substrate in the radial direction in the optical recording medium A and the optical recording medium B.

In the optical recording medium master B, the groove height was substantially uniform over the whole track region, but in the optical recording medium master A, although the groove height was almost constant in the area from a radius of 23.1 mm to a radius of 39 mm, it increased gradually as the radius increased, and at the radius of 41.3 mm the groove height was approximately 108% of that at the radius of 39 mm. A scanning tunnel microscope was used for determining the groove shape. Also, in the optical recording medium master B, the prepit size was substantially uniform over the whole track region, but in the optical recording medium master A, although the prepit size was almost constant in the area from a radius of 23.1 mm to a radius of 39 mm, it enlarged gradually as the radius increased, and at the radius of 41.3 mm the prepit size was approximately 107% of that at the radius of 39 mm. A scanning tunnel microscope and an electron microscope were used for determining the prepit size.

As is seen from FIG. 7, the groove depth in the optical recording medium B became shallower toward the outer periphery, while in the optical recording medium A the groove depth was substantially uniform over the whole track region.

Figure 8:
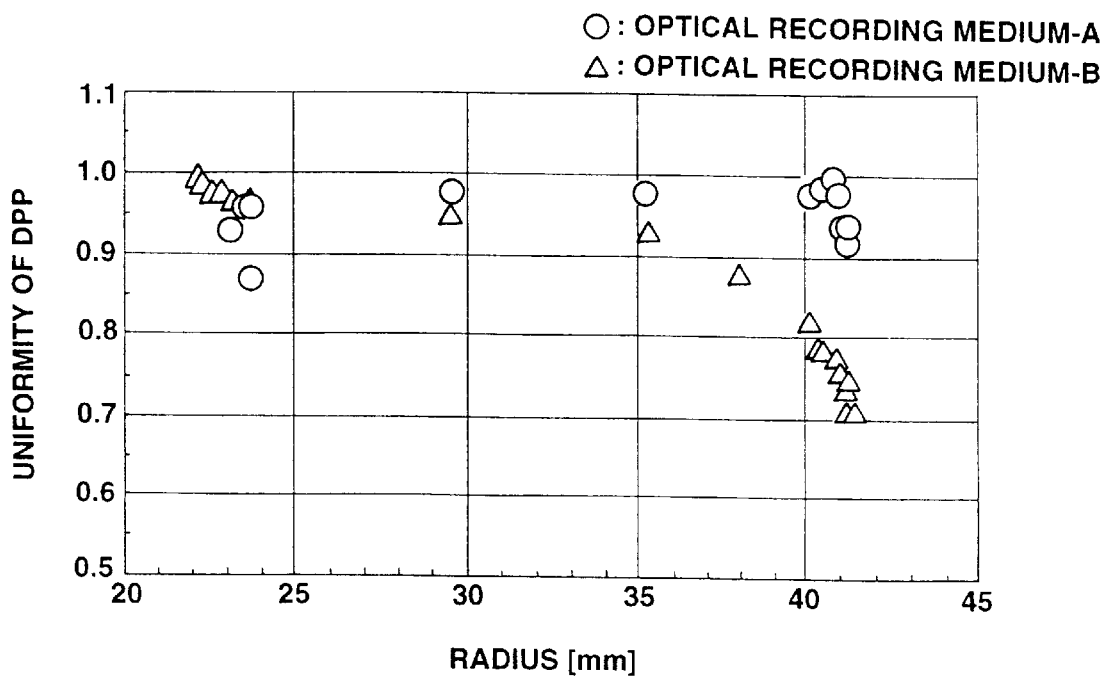
FIG. 8 is a graph showing dependency of DPP signal uniformity in the radial direction in the optical recording medium A and the optical recording medium B.

FIG. 8 is a graph showing dependency of DPP signal uniformity in the radial direction in the optical recording medium A and the optical recording medium B. For stable tracking of the optical head on a specific track, DPP signal uniformity needs to be not less than 0.70.

In the case of the optical recording medium A, DPP signal uniformity was not less than 0.80 over the whole track region. However, in the inner peripheral control track region having the medium information tracks, DPP signal level was different from the other regions and a drop of DPP signal uniformity was noted. In the case of the optical recording medium B, DPP signal uniformity greatly drops in the area outside the radius of 39 mm and sharply drops in the area outside a radius of 41 mm, so that at the outermost periphery (with a radius of 41.3 mm) of the track region, DPP signal uniformity is barely not less than 0.70. In the case of the optical recording medium B, too, since the medium information tracks exist in the inner peripheral control track region, DPP signal level was different from the other regions and a drop of DPP signal uniformity was seen. If the outermost periphery of the track region is within a radius of 41.3 mm, it is possible to perform stable tracking of the optical head on a specific track. More preferably, in the stage of the optical recording medium master, the groove height in the area outside a radius of 39 mm are made higher 105 to 115% than the groove height in the area inside the radius, and DPP signal uniformity is maintained not less than 0.8.

Figure 9:
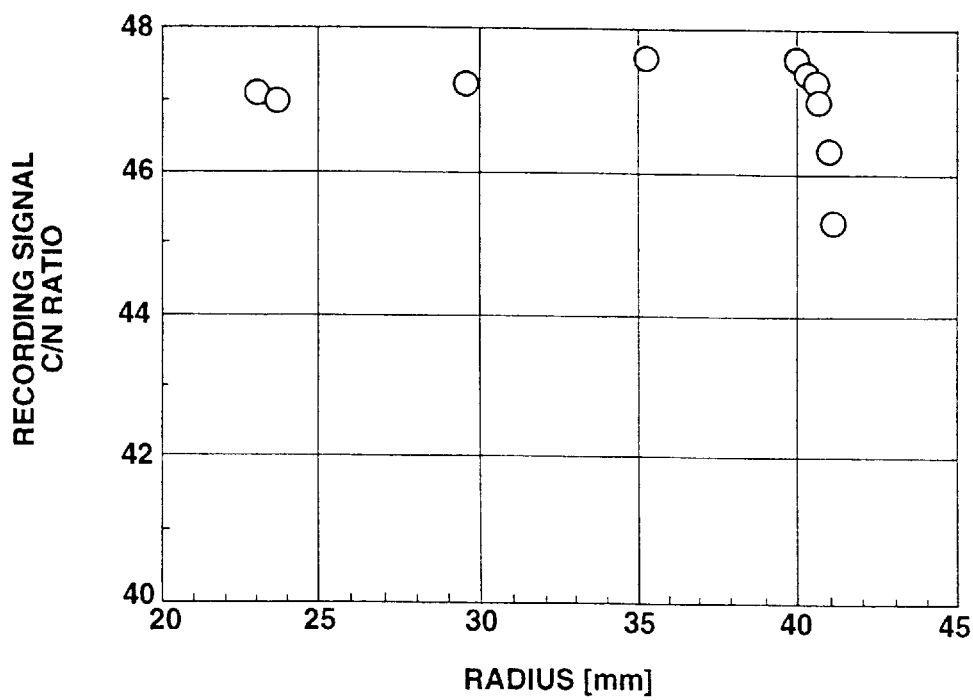
FIG. 9 is a graph showing dependency of the CN ratio in the recording layer of the optical recording medium A in the radial direction.

FIG. 9 is a graph showing dependency of the CN ratio, that is, reading-out signal, in the recording layer of the optical recording medium A in the radial direction.

The CN ratio was substantially constant at 43 dB over the whole track region.

Figure 10:
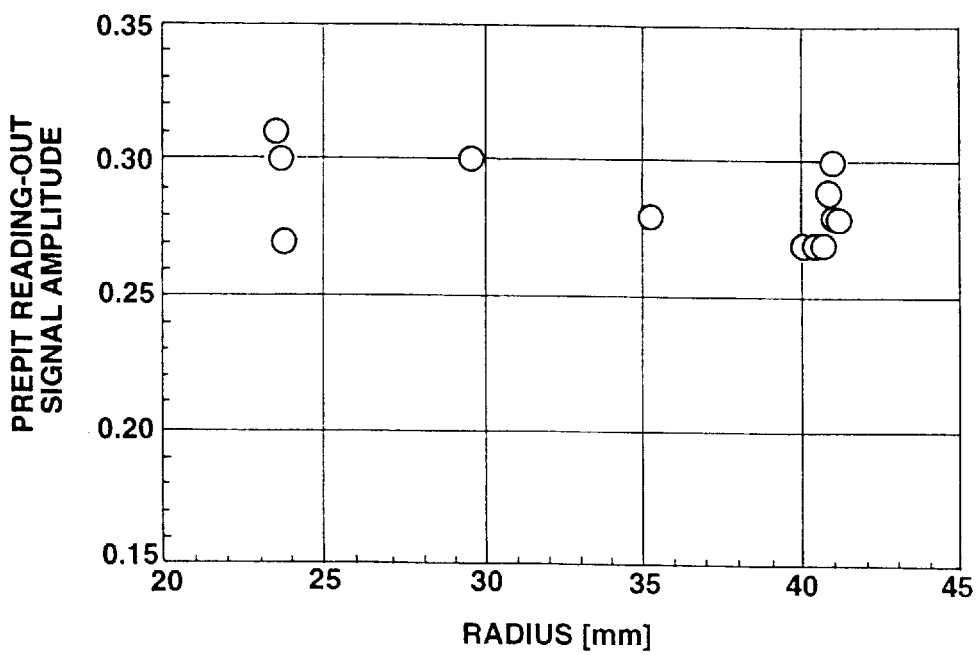
FIG. 10 is a graph showing dependency of the prepit reading-out signal amplitude of the optical recording medium A in the radial direction.

FIG. 10 is a graph showing dependency of the prepit reading-out signal amplitude of the optical recording medium A in the radial direction. Normalization was made with reflectance of the land as reference.

The reading-out signal amplitude was not less than 0.20 over the whole track region.

The optical recording media according to the present invention include rewritable media, media capable of reading-out alone and write once media.

TABLE 1

|   | Component A | | Component B | | Average molecular weight | Tg °C. |
|---|---|---|---|---|---|---|
|   | Bisphenolic compound | wt % | Bisphenolic compound | wt % | | |
| Preparation Example 1 | 1,1-bis(4-hydroxyphenyl)-1-phenylethane | 0 | Bisphenol A | 100 | 15000 | 145 |
| Preparation Example 2 | 1,1-bis(4-hydroxyphenyl)-1-phenylethane | 15.5 | Bisphenol A | 84.5 | 13700 | 151 |
| Preparation Example 3 | 1,1-bis(4-hydroxyphenyl)-1-phenylethane | 27.1 | Bisphenol A | 72.9 | 13700 | 156 |
| Preparation Example 4 | 1,1-bis(4-hydroxyphenyl)-1-phenylethane | 56.0 | Bisphenol A | 44.0 | 12800 | 166 |
| Preparation Example 5 | 1,1-bis(4-hydroxyphenyl)-1-phenylethane) | 55.9 | Bisphenol A | 44.1 | 13400 | 166 |
| Preparation Example 6 | 1,1-bis(4-hydroxyphenyl)-1-phenylethane) | 55.9 | Bisphenol A | 44.1 | 14200 | 166 |
| Preparation Example 7 | 1,1-bis(4-hydroxyphenyl)-1-phenylethane | 75.4 | Bisphenol A | 24.6 | 13200 | 173 |
| Preparation Example 8 | 1,1-bis(4-hydroxyphenyl)-1-phenylethane | 100 | Bisphenol A | 0 | 13000 | 184 |
| Preparation Example 9 | 1,1-bis(4-hydroxyphenyl)-1-phenylethane | 9.6 | Bisphenol A | 90.4 | 13500 | 149 |
| Comp. Preparation Example 1 | 1,1-bis(4-hydroxyphenyl)-1-phenylethane | 55.3 | Bisphenol A | 44.7 | 9500 | 160 |
| Comp. Preparation Example 2 | 1,1-bis(4-hydroxyphenyl)-1-phenylethane | 55.5 | Bisphenol A | 44.5 | 22500 | 173 |
| Comp. Preparation Example 3 | 1,1-bis(4-hydroxyphenyl)-1-phenylethane | 0 | Bisphenol A | 100 | 21000 | 147 |

TABLE 2

| 86 mm Substrate | Resin used | Resin temp. °C. | Mold temp. °C. | cooling time (sec) |
|---|---|---|---|---|
| Work Example 1 | Preparation Example 1 | 350 | 110 | 5 |
| Work Example 2 | Preparation Example 1 | 350 | 120 | 10 |
| Work Example 3 | Preparation Example 2 | 350 | 120 | 7 |
| Work Example 4 | Preparation Example 2 | 350 | 130 | 10 |
| Work Example 5 | Preparation Example 3 | 350 | 120 | 7 |
| Work Example 6 | Preparation Example 3 | 350 | 130 | 10 |
| Work Example 7 | Preparation Example 4 | 370 | 130 | 7 |
| Work Example 8 | Preparation Example 5 | 370 | 135 | 7 |
| Work | Preparation | 380 | 135 | 7 |

TABLE 2-continued

| 86 mm Substrate | Resin used | Resin temp. °C. | Mold temp. °C. | cooling time (sec) |
|---|---|---|---|---|
| Work Example 9 | Preparation Example 6 | 380 | 135 | 7 |
| Work Example 10 | Preparation Example 7 | 380 | 145 | 5 |
| Work Example 11 | Preparation Example 8 | 350 | 120 | 7 |
| Work Example 12 | Preparation Example 3 | 350 | 130 | 10 |
| Work Example 13 | Preparation Example 3 | 350 | 110 | 10 |
| Comp. Work Example 1 | Preparation Example 1 | 350 | 135 | 4 |
| Comp. Work Example 2 | Preparation Example 2 | 350 | 120 | 10 |
| Comp. Work Example 3 | Preparation Example 3 | 350 | 130 | 3 |
| Comp. Work Example 4 | Preparation Example 3 | 350 | 130 | 7 |
| Comp. Work Example 5 | Preparation Example 8 | | | |

| 86 mm Substrate | Lateral birefringence × $10^{-6}$ | Vertical birefringence × $10^{-6}$ | Mechanical properties | Replication |
|---|---|---|---|---|
| Work Example 1 | −20 / 18 | 425 / 435 | ○ | ○ |
| Work Example 2 | −18 / −10 | 440 / 445 | ○ | ○ |
| Work Example 3 | −17 / 4 | 400 / 410 | ○ | ○ |
| Work Example 4 | −15 / 10 | 370 / 375 | ○ | ○ |
| Work Example 5 | −10 / −8 | 390 / 430 | ○ | ○ |
| Work Example 6 | −19 / 8 | 390 / 415 | ○ | ○ |
| Work Example 7 | −14 / 2 | 380 / 400 | ○ | ○ |
| Work Example 8 | −20 / 3 | 365 / 380 | ○ | ○ |
| Work Example 9 | −15 / 1 | 370 / 390 | ○ | ○ |
| Work Example 10 | −9 / 5 | 370 / 395 | ○ | Δ |
| Work Example 11 | −5 / 5 | 320 / 350 | ○ | Δ |
| Work Example 12 | 1 / 7 | 360 / 370 | ○ | ○ |
| Work Example 13 | −1 / 6 | 350 / 360 | ○ | ○ |
| Comp. Work Example 1 | −15 / 4 | 510 / 530 | ○ | ○ |
| Comp. Work Example 2 | −50 / 20 | 250 / 280 | X | Unmeasurable |
| Comp. Work Example 3 | −13 / 2 | 440 / 480 | ○ | Δ |
| Comp. Work Example 4 | −40 / 25 | 250 / 300 | X | ○ |
| Comp. Work Example 5 | 4 / 20 | 370 / 390 | ○ | X |

TABLE 3

| 86 mm Substrate | Resin used | Resin temp. °C. | Mold temp. °C. | cooling time (sec) | Annealing temp. °C. | Annealing time (min) |
|---|---|---|---|---|---|---|
| Work Example 14 | Preparation Example 1 | 350 | 110 | 7 | 110 | 60 |
| Work Example 15 | Preparation Example 1 | 350 | 120 | 10 | 100 | 60 |
| Work Example 16 | Preparation Example 9 | 350 | 120 | 10 | 100 | 60 |
| Work Example 17 | Preparation Example 9 | 350 | 120 | 7 | 120 | 60 |
| Comp. Work Example 6 | Preparation Example 1 | 350 | 100 | 7 | 120 | 60 |
| Comp. Work Example 7 | Preparation Example 1 | 350 | 110 | 5 | Untreated | Untreated |
| Comp. Work Example 8 | Preparation Example 1 | 350 | 120 | 5 | 90 | 60 |
| Comp. Work Example 9 | Preparation Example 9 | 350 | 130 | 10 | 130 | 60 |
| Comp. Work Example 10 | Comp. Preparation Example 3 | 380 | 110 | 7 | 110 | 120 |

| 86 mm Substrate | Lateral birefringence × $10^{-6}$ | Vertical birefringence × $10^{-6}$ | Mechanical properties | Replication |
|---|---|---|---|---|
| Work Example 14 | −3 | 420 | ○ | ○ |
| Work Example 15 | 5 | 430 | | |
| Work Example 16 | −10 | 410 | ○ | ○ |
| | 6 | 430 | | |
| Work Example 17 | −5 | 360 | ○ | ○ |
| | 5 | 400 | | |
| Comp. Work Example 6 | −3 | 330 | ○ | ○ |
| | 4 | 350 | | |
| Comp. Work Example 7 | 20 | 450 | ○ | Δ |
| | 1 | 460 | | |
| Comp. Work Example 8 | −40 | 430 | ○ | ○ |
| | 20 | 440 | | |
| Comp. Work Example 9 | −25 | 300 | X | ○ |
| | 5 | 320 | | |
| Comp. Work Example 10 | −4 | 290 | X | ○ |
| | 5 | 320 | | |
| (additional) | 25 | 430 | ○ | Δ |
| | 6 | 440 | | |

What is claimed is:

1. An optical recording medium, comprising a track region having a plurality of tracks arranged along the concentric or spiral grooves, said track region being radially divided into annular zones, and each of said tracks being partitioned into plural sectors such that a number of said sectors per track is constant in each zone but said number of sectors per track differs between among zones, wherein an address designating a specific track and sector is previously recorded as a plurality of prepits, said track region having a user-track region, in which a user can optically record or readout information, and a pair of control-track regions, radially bracketing said user-track region, said control-track region permitting said user to read out information therefrom but not to record information thereon, and wherein said control-track region located radially inward of the user-track region is provided with medium information tracks in which medium information has been recorded as prepits, and the control-track region located outward of the user-track region has no medium information track and is not used for recording, nor for reading out of user data.

2. An optical recording medium according to claim 1, wherein an identical number of sectors are provided per track in the outermost annular track of said user-track region and in the control track region radially outward of said user-track region.

3. An optical recording medium, comprising
a track region having a plurality of tracks arranged along the concentric or spiral grooves, said track region being radially divided into annular zones, and each of said tracks being partitioned into plural sectors such that a number of said sectors per track is constant in each zone but said number of said sectors per track differs between among zones,
wherein an address designating a specific track and sector is previously recorded as a plurality of prepits, said track region having a user-track region, in which a user can optically record or readout information, and a pair of control-track regions, radially bracketing said user-track region, said control-track region permitting said user to read out information therefrom but not to record information thereon, and
wherein said control-track region located radially inward of the user-track region is provided with medium information tracks in which medium information has been recorded as prepits, and the control-track region located outward of the user-track region has no medium information track and is not used for recording, nor for reading out of user data,
the radius of the outer periphery of said optical recording medium is 43 mm, no track region exists outside a radius of 41.3 mm of the medium and no user-track region exists outside a radius of 41.0 mm of the medium, and said prepits are recorded according to a pulse-width modulation (PWM) system.

4. An optical recording medium according to claim 3, wherein the track pitch is not more than 1.1 μm and the minimum mark length in the user track region is not more than 0.64 μm.

5. An optical recording medium according to claim 3, wherein an identical number of sectors are provided per track in the outermost annular track of said user-track region and in the control track region radially outward of said user-track region.

6. An optical recording medium having a track region comprising
a plurality of tracks provided along the concentric or spiral grooves, said track region being radially divided into annular zones, and each of said tracks being partitioned into plural sectors such that the number of said sectors per track is constant in each zone but differs between zones,
wherein an address designating a specific track and sector is previously recorded as prepits, said track region having a user-track region, in which a user can optically record or readout information, and a pair of control-track regions, radially bracketing said user-track region, said control-track regions permitting said user to read out information therefrom but not to record information thereon, and
wherein said control-track region located radially inward of the user-track region is provided with medium information tracks in which medium information has been recorded as prepits, and the control-track region located outward of the user-track region has no medium information track and is not used for recording, nor for reading out of user data,
the radius of the outer periphery of said optical recording medium is 43 mm, no track region is present outside a radius of 41.3 mm of the medium, and in the track region, tracking of an optical head along a specific track is performed by making use of the grooves, and tracking signal uniformity is not less than 0.80.

7. An optical recording medium according to claim 6, wherein a carrier/noise (CN) ratio of reading-out signal in a recording layer in the track region is not less than 43 dB.

8. An optical recording medium according to claim 7, wherein the reading-out signal amplitude of the prepits in the track region is not less than 0.18, calculated on the basis of reflectance of the land adjacent said prepits.

9. An optical recording medium according to claim 6, wherein an identical number of sectors are provided per track in the outermost annular track of said user-track region and in the control track region radially outward of said user-track region.

10. A process for producing an optical recording medium set forth in claim 4, comprising the steps of
carrying out an injection compression molding of a resin from an optical recording medium master having a fine pattern thereon, thereby replicating the fine pattern and making a substrate of optical recording medium, and
then forming at least a recording layer on said substrate, wherein the height of the grooves in said optical recording medium master is substantially constant up to a radius of 39 mm and becomes greater from the radius of 39 mm outward, and at a point with a radius of 41.3 mm, the groove height is 105 to 115%, based on the groove height in the area within a radius of 39 mm.

11. The process according to claim 10, wherein the width or height of the prepits in the optical recording medium master is substantially constant up to a radius of 39 mm and becomes greater from the radius of 39 mm outward, and
at the point with a radius of 41.3 mm, the width or height of the prepits is 105 to 115%, based on that of the prepits in the area within a radius of 39 mm.

12. A process for producing a substrate for an optical recording medium set forth in claim 1, comprising the steps of
carrying out injection compression molding of a polycarbonate resin having an average molecular weight of 10,000 to 20,000 at a mold temperature satisfying the following formula:

$$Tg-40°\ C.\leq Tmo \leq Tg-10°\ C.,$$

wherein Tmo is a mold temperature, and Tg is glass transition point of said resin as determined by a differential scanning calorimeter, thereby replicating the fine pattern on said optical recording medium master, and
then cooling the resin in the mold for a period satisfying the following formula:

$$-0.1\times(Tg-Tmo)+6 \leq tc \leq -0.33\times(Tg-Tmo)+20,$$

wherein tc (sec) is a cooling time of the resin in the mold, and wherein the polycarbonate resin comprises first carbonate bond-constructing units (component A) having at least one aromatic group are contained in a percentage of 100 to 0 wt %, based on all of the carbonate bond-constructing units, and second carbonate bond-constructing units (component B) having a group represented by following formula (1):

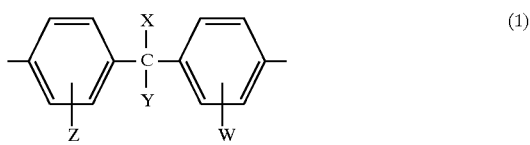

wherein X, Y, Z and W are each selected from the group consisting of a hydrogen atom, and an aliphatic hydrocarbon group having 1–6 carbon atoms, are contained in a percentage of 0 to 100 wt %, based on all of the carbonate bond-constructing units.

13. The process according to claim 12, wherein the polycarbonate resin is a copolymerized polycarbonate comprising first carbonate bond-constructing units having at least one aromatic group (component A) and second carbonate bond-constructing units (component B) having a group represented by the formula (1).

14. The process according to claim 12, wherein the polycarbonate resin is a mixture containing a polycarbonate comprising first carbonate bond-constructing units having at least one aromatic group (component A) and second carbonate bond-constructing units (component B) having a group represented by the formula (1).

15. The process according to claim 12, wherein said component A consists of a carbonate bond-constructing unit having a group represented by the following formula (2):

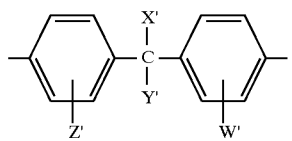

(2)

wherein X' and Y' are each selected from the group consisting of a hydrogen atom, an aliphatic hydrocarbon group having 1–6 carbon atoms, an aryl group and an aralkyl group, and wherein at least one of X' and Y' is an aryl group or an aralkyl group; and Z' and W' are each selected from the group consisting of a hydrogen atom and an aliphatic hydrocarbon group having 1–6 carbon atoms.

16. A process for producing an optical recording medium set forth in claim 1, comprising the steps of carrying out an injection compression molding of a polycarbonate resin having an average molecular weight of 10,000 to 20,000 at a mold temperature satisfying the following formula:

$$Tg-40° C. \leq Tmo \leq Tg-10° C.,$$

wherein Tmo is a mold temperature and Tg is glass transition point of the resin determined by a differential scanning calorimeter, thereby replicating the fine pattern on the optical recording medium master, cooling the resin in the mold for a period satisfying the following formula:

$$-0.1 \times (Tg-Tmo)+6 \leq tc \leq -0.33 \times (Tg-Tmo)+20,$$

wherein tc (sec) is a cooling time of the resin in the mold, and then annealing for at least 30 minutes at a temperature satisfying the following formula:

$$Tg-50° C. \leq Ta \leq Tg-20° C.,$$

wherein Ta is a annealing temperature, wherein the polycarbonate resin comprises first carbonate bond-constructing units (component A) having at least one aromatic group are contained in a percentage of 20 to 0 wt %, based on all of the carbonate bond-constructing units and second carbonate bond-constructing units (component B) having a group represented by the formula (1) are contained in a percentage of 80 to 100 wt %, based on all of the carbonate bond-constructing units.

17. The process according to claim 16, wherein the polycarbonate resin is a copolymerized polycarbonate comprising first carbonate bond-constructing units (component A) having at least one aromatic group and second carbonate bond-constructing units (component B) having a group represented by the formula (1).

18. The process according to claim 16, wherein the polycarbonate resin is a mixture containing a polycarbonate comprising first carbonate bond-constructing units (component A) having at least one aromatic group and second carbonate bond-constructing units (component B) having a group represented by the formula (1).

19. The process according to claim 16, wherein the component A consists of carbonate bond-constructing units having a group represented by the formula (2).

* * * * *